United States Patent
Mokunaka

(10) Patent No.: US 7,379,666 B2
(45) Date of Patent: May 27, 2008

(54) ELECTRONIC APPLIANCE

(75) Inventor: Kaoru Mokunaka, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 267 days.

(21) Appl. No.: 10/563,638

(22) PCT Filed: Sep. 29, 2004

(86) PCT No.: PCT/JP2004/014677

§ 371 (c)(1),
(2), (4) Date: Jan. 6, 2006

(87) PCT Pub. No.: WO2005/031553

PCT Pub. Date: Apr. 7, 2005

(65) Prior Publication Data

US 2006/0159444 A1    Jul. 20, 2006

(30) Foreign Application Priority Data

Sep. 30, 2003    (JP) .............................. 2003-340429

(51) Int. Cl.
*G03B 17/00* (2006.01)
*G03B 13/14* (2006.01)
*H04N 5/76* (2006.01)
*H04N 3/16* (2006.01)

(52) U.S. Cl. .................. 396/299; 396/374; 348/231.2; 348/333.11

(58) Field of Classification Search .................. 396/49, 396/63, 169, 299, 238, 242, 429, 374; 323/282, 323/284; 354/38, 402, 412, 441, 442, 423; 348/231.2, 333.11
See application file for complete search history.

(56) References Cited

U.S. PATENT DOCUMENTS

| | | | |
|---|---|---|---|
| 4,431,287 A * | 2/1984 | Sakai et al. .................. | 396/238 |
| 6,526,234 B1 * | 2/2003 | Malloy Desormeaux .... | 396/374 |
| 6,577,821 B2 * | 6/2003 | Malloy Desormeaux .... | 396/374 |
| 6,674,467 B1 * | 1/2004 | Lee .......................... | 348/231.2 |
| 6,831,448 B2 * | 12/2004 | Ishii et al. .................. | 323/282 |
| 6,930,718 B2 * | 8/2005 | Parulski et al. ......... | 348/333.11 |

FOREIGN PATENT DOCUMENTS

JP    2-259968    10/1990

* cited by examiner

*Primary Examiner*—Melissa Jan Koval
(74) *Attorney, Agent, or Firm*—Hamre, Schumann, Mueller & Larson, P.C.

(57) ABSTRACT

An electronic appliance is provided, which can be produced at a low cost, and in which there is a degree of freedom in a setting value and any one of a number of setting values can be set as an operating condition with a simple operation. A digital camera 1 includes a first operation switch (for example, a shutter dial 2) that allows an operator to select a first state assigned one setting value (for example, a shutter speed) or a second state assigned a plurality of setting values, a liquid crystal monitor 9 that displays the setting values assigned to the second state when the second state is selected with an operation switch, and a second operation switch (for example, an auxiliary dial 7) that allows the operator to select any one of the setting values displayed on the liquid crystal monitor 9.

9 Claims, 30 Drawing Sheets

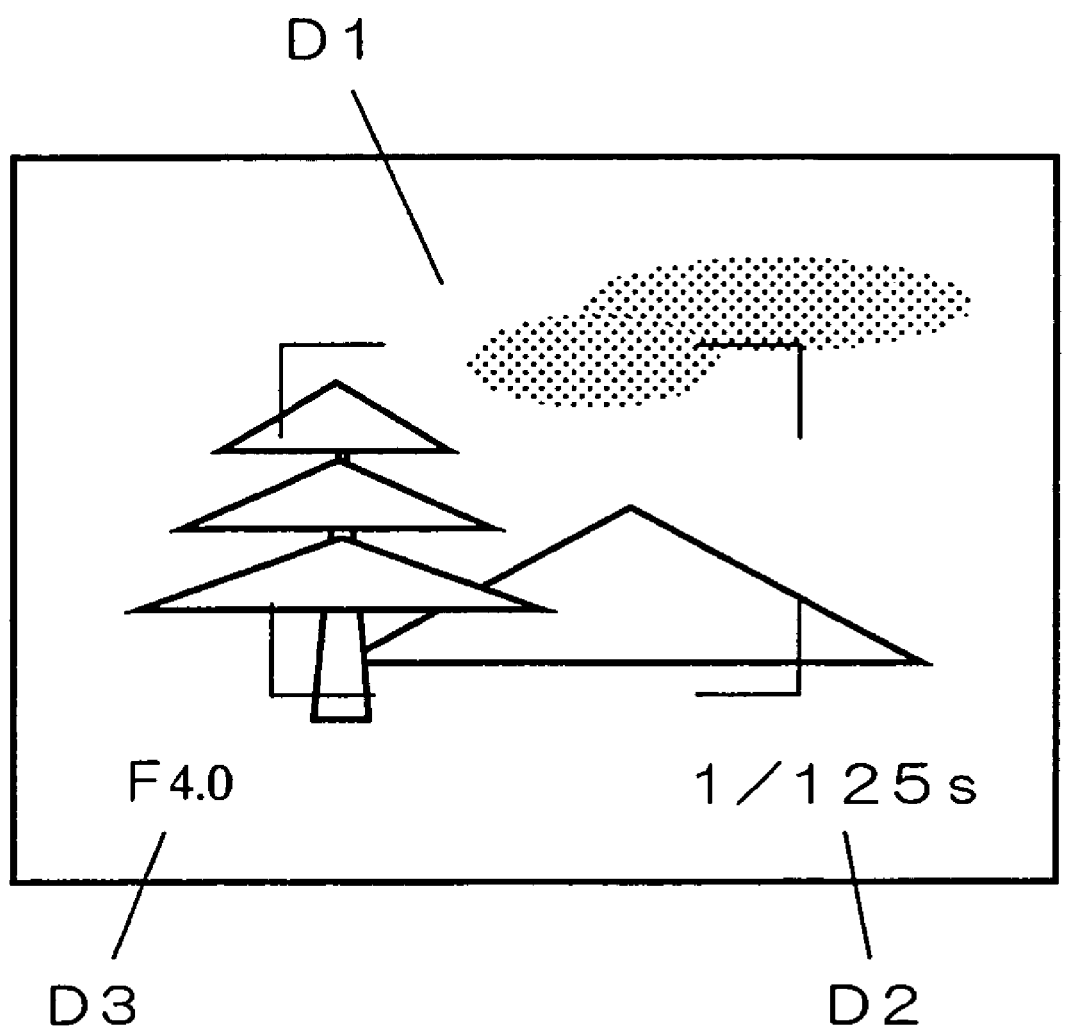
F I G. 8

ELECTRONIC APPLIANCE

TECHNICAL FIELD

The present invention relates to an electronic appliance in which an operating condition is set using a mechanical operation switch such as a dial and a display screen.

BACKGROUND ART

Recently, electronic appliances such as a digital camera and a mobile telephone are being miniaturized. Along with this, operation components provided therein also are being miniaturized. Such a tendency also is found in operation components (for example, a dial) for selecting any one of a plurality of setting values by varying the position thereof mechanically. On the other hand, due to the increased performance of an electronic appliance, a number of setting values have come to be selected. Thus, irrespective of whether the above-mentioned operation components are being reduced in size, the number of selectable setting values is increasing.

Under such a circumstance, the interval between positions (dial marks, etc.) assigned setting values respectively in the above-mentioned operation buttons is becoming narrow. Therefore, it is difficult for a user to position the operation components and to set them at desired setting values.

In order to solve this problem, Patent Document 1 (JP 2000-122114 A) discloses a camera provided with a switch for switching setting values in a dial. Hereinafter, a conventional camera described in Patent Document 1 will be described.

FIG. 30 is a schematic view showing a shutter dial 502 and an operation lever 504 of the conventional camera. An index 503 is fixed to a camera body. The shutter dial 502 includes dial marks 502a to 502s. The shutter dial 502 rotates. Therefore, an operator can orient any one of the dial marks 502a to 502s to the index 503.

When the dial mark 502a is oriented to the index 503, the shutter speed of the camera is set automatically. When the dial mark 502s is oriented to the index 503, the shutter of the camera remains open until a shutter button is pressed again after being pressed (valve setting).

When any one of the dial marks 502b to 502r is oriented to the index 503, the shutter speed is varied depending upon the state of an operation lever 504. When the operation lever 504 is at a position A in FIG. 30, the shutter speed is represented by an inverse of a number printed in the vicinity of a dial mark on the surface of the shutter dial. For example, as shown in FIG. 30, when the dial mark 502k is oriented to the index 503, a printed number is "15", so that the shutter speed becomes $\frac{1}{15}$ seconds.

On the other hand, when the operation lever 504 is at a position B in FIG. 30, the shutter speed is represented by a number printed in the vicinity of a dial mark on the surface of the shutter dial 502. For example, as shown in FIG. 30, when the dial mark 502k is oriented to the index 503, a printed number is "15", so that the shutter speed becomes 15 seconds.

As described above, according to the conventional camera disclosed in Patent Publication 1, due to the presence of the operation lever 504, the shutter dial 502 can be used both for an ordinary mode and a long second mode, and a number of shutter speeds, which can be set with the shutter dial 502, can be provided.

However, according to the above-mentioned conventional camera, in order to provide a number of setting values of the shutter speed, it is necessary to newly provide the operation lever 504. Therefore, there is a problem that the production cost of a camera increases due to the increase in the number of members. Furthermore, recently, there is a tendency for a camera to be miniaturized; therefore, there is a problem that no space is available for newly providing the operation lever 504.

Furthermore, the operator does not know a shutter speed unless he/she always grasps whether the operation lever 504 is at the position A or B, so that it is difficult to grasp a shutter speed through intuition. Because of this, the operator makes an operation error while taking a picture. For example, in the case where the operator mistakenly understands that the operation lever 504 is at the position A in spite of the fact that it is at the position B, when the operator desires to set the shutter speed to be lower than that at the current setting (rotate the shutter dial 502 in a CC direction in the figure), the operator may rotate it in a CW direction in the figure to set the shutter speed to be higher than that of the current setting. Consequently, the operator takes a picture at an incorrect exposure amount and misses a shutter chance.

Furthermore, due to the presence of the operation lever 504, the number of settable shutter speeds increases; however, some of the settable shutter speeds (2000 seconds, 4000 seconds, etc.) actually have a very low possibility for use. Thus, the number of effective shutter speeds is not so large. That is, there is a problem that no degree of freedom is available in settable values of the shutter speed.

DISCLOSURE OF INVENTION

The present invention solves the problems of the above-mentioned prior art, and its object is to provide an electronic appliance that can be produced at a low cost, and in which there is a degree of freedom in setting values and any one of a number of setting values can be set as an operating condition with a simple operation.

In order to achieve the above-mentioned object, an electronic appliance of the present invention includes: a first operation switch that allows an operator to select a first state assigned one setting value or a second state assigned a plurality of setting values; a display that displays the setting values assigned to the second state, when the second state is selected with the first operation switch; a second operation switch that allows the operator to select any one of the setting values displayed on the display; and a controller that sets the setting value assigned to the first state as an operating condition, when the first state is selected with the first operation switch, and sets the setting value selected with the second operation switch as the operating condition, when the second state is selected with the first operation switch.

The "operation switch" is a member that an operator rotates or presses to input an operator's selection to an electronic appliance, and examples thereof include a dial, a button, a key, a jog dial, etc.

Thus, the electronic appliance according to the present invention has a satisfactory operability since a setting value can be changed mechanically with the first operation switch. Then, setting values other than those that can be set with the first operation switch can be set by changing the setting value displayed on the display with the second operation switch, so that a number of setting values can be set.

Furthermore, it is preferable that the controller of the electronic appliance according to the present invention allows the display to show a display that prompts the operator to select a setting value with the second operation switch, when the second state is selected with the first operation switch. Thus, a display that prompts the operator to select a setting value with the second operation switch is performed, so that the operator easily can understand an operation method.

Furthermore, in the electronic appliance according to the present invention, it is preferable that the display that prompts the operator to select a setting value with the second operation switch includes a picture symbol. Thus, a display that prompts the operator to select a setting value with the second operation switch includes a picture symbol such as the second operation switch, so that the operator easily can understand an operation method further.

Furthermore, it is preferable that the controller of the electronic appliance according to the present invention varies a display embodiment of a setting value to be displayed on the display before and after setting the setting value selected with the second operation switch as the operating condition. Thus, the display embodiment of a setting value is varied before and after the setting with the second operation switch, so that the operator easily can grasp whether or not the setting with the second operation switch has been completed. Furthermore, the display embodiment of a setting value is varied between the case of setting with the first operation switch and the case of setting with the second operation switch, so that the operator easily can grasp which of the operation switches has been used for setting a setting value, or which of the operation switches should be used for setting a setting value.

The electronic appliance according to the present invention may be a camera, and the setting value may be at least one of a shutter speed and an aperture value. According to this configuration, a number of shutter speeds or aperture values can be set, and the electronic appliance has a satisfactory operability.

The electronic appliance according to the present invention may be a mobile telephone terminal, and the setting value may be a transmission destination identifier.

The electronic appliance according to the present invention may be a television receiver set, and the setting value may be a broadcast channel.

The electronic appliance according to the present invention may be a household electric appliance for cooking, and the setting value may be a cooking menu.

The electronic appliance according to the present invention may have a plurality of operation modes, and the setting value may be the operation mode.

As described above, according to the present invention, a setting value can be changed mechanically with the first operation switch, so that a satisfactory operability is obtained. Setting values other than those which can be set with the first operation switch can be set by changing the setting value displayed on the display with the second operation switch, so that a number of setting values can be set. Thus, the electronic appliance according to the present invention can be produced at a low cost, in which there is a degree of freedom for a setting value, and any one of a number of setting values can be set with a simple operation.

BRIEF DESCRIPTION OF DRAWINGS

FIG. 8 is a schematic view showing a screen display of a liquid crystal monitor of the digital camera.

DESCRIPTION OF THE INVENTION

Figure 1:
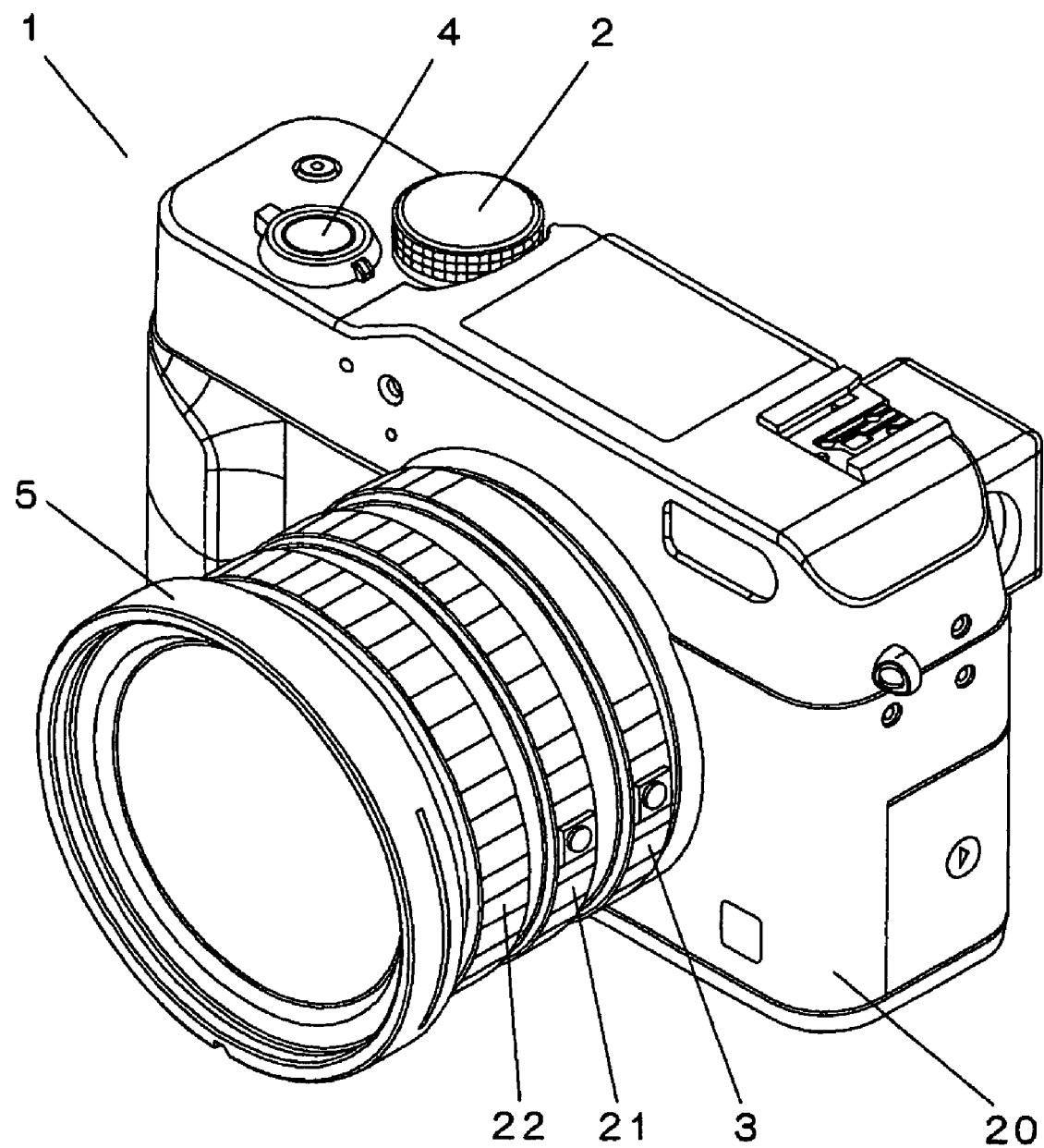
FIG. 1 is a perspective view seen from a front side of a digital camera according to Embodiment 1 of the present invention.

The present invention is applicable to an electronic appliance in which an operating condition is set using a mechanical operation switch such as a dial and a display screen. Hereinafter, the present invention will be described by way of embodiments 1 to 4, illustrating the case of applying the present invention to a digital cameral, a mobile telephone terminal, a television receiver set, and a microwave oven. However, the applications of the present invention are not limited thereto.

Embodiment 1

In a digital camera 1 according to Embodiment 1 of the present invention, an operator easily can set a shutter speed with a high setting frequency, using a shutter dial 2, and can select a desired shutter speed from a number of selective candidates, using an auxiliary dial 7, a determination button 8, and a liquid crystal monitor 9. Similarly, the operator easily can set an aperture value with a high setting frequency, using an aperture dial, and can select a desired aperture value from a number of selective candidates, using the auxiliary dial 7, the determination button 8, and the liquid crystal monitor 9. Hereinafter, the digital camera 1 according to Embodiment 1 of the present invention will be described with reference to FIGS. 1 to 14.

Figure 2:
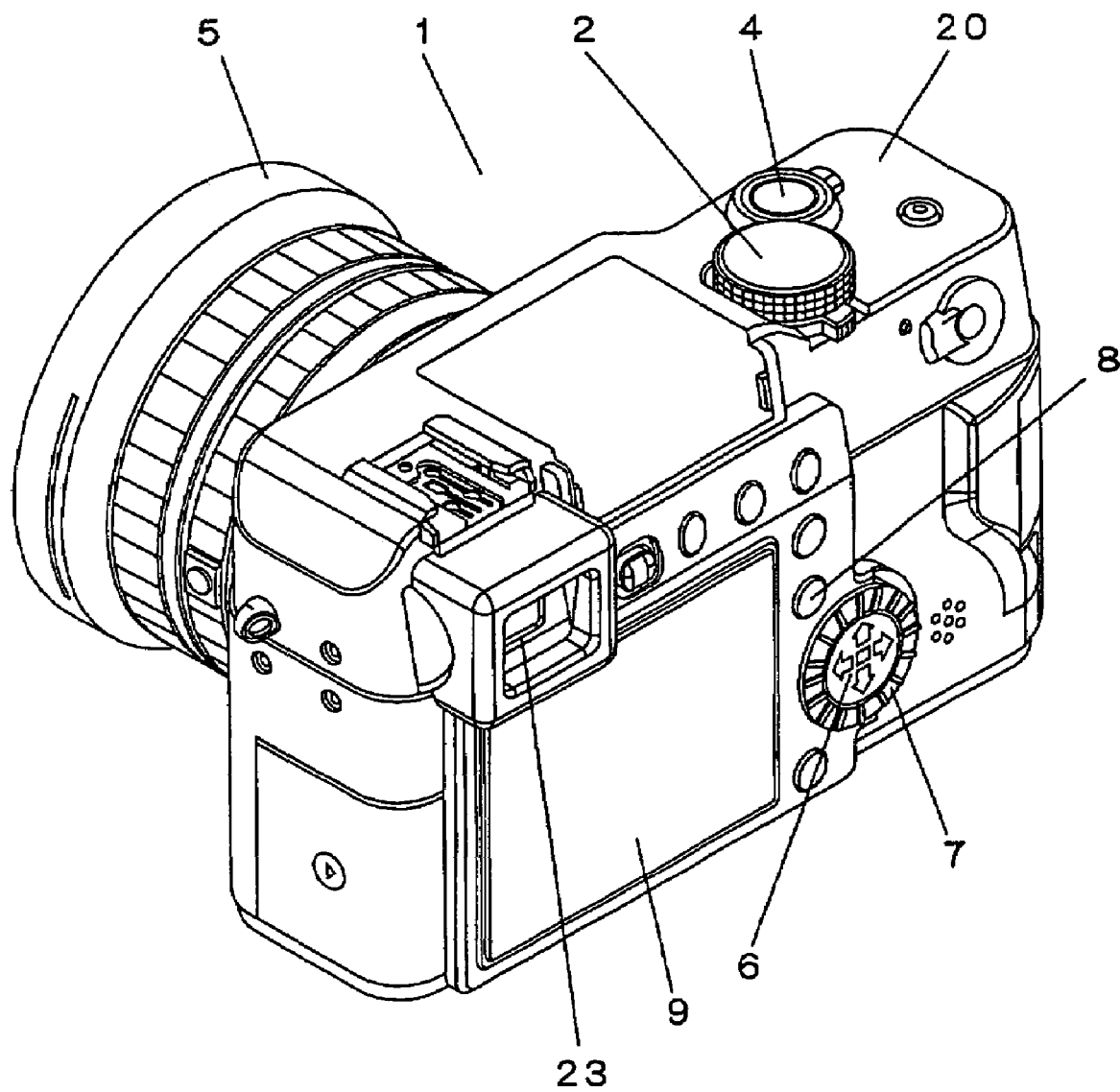
FIG. 2 is a perspective view seen from a back side of the digital camera.

FIG. 1 is a perspective view seen from a front side of the digital camera 1 according to Embodiment 1 of the present invention. FIG. 2 is a perspective view seen from a back side of the digital camera 1. The digital camera 1 is composed of a camera body 20 and a lens barrel 5. As shown in FIG. 1, an aperture dial 3, a zoom ring 21, and a focus ring 22 are provided rotatably around an outer circumference of the lens barrel 5.

Figure 3:
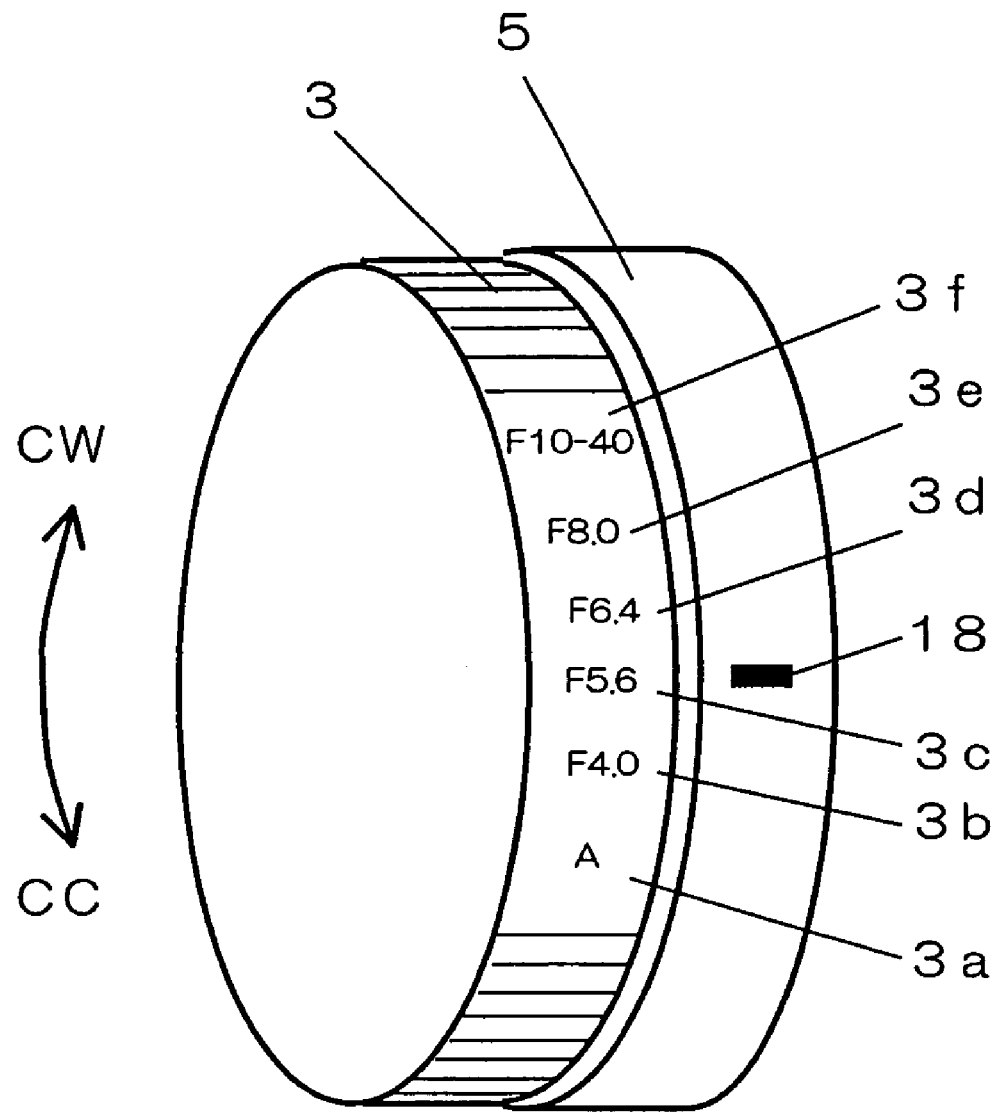
FIG. 3 is a schematic view showing an aperture dial of the digital camera.

The aperture dial 3 is an operation switch for selecting an aperture value of the digital camera 1. Herein, FIG. 3 is a schematic view showing a configuration of the aperture dial 3. The aperture dial 3 can rotate in a direction of an arrow CW (clockwise direction) or an arrow CC (counterclockwise direction) in the figure. The aperture dial 3 includes a plurality of dial marks 3a to 3f. At the dial mark 3a, "A" indicating that an aperture value is set automatically is displayed. At the dial marks 3b to 3e, respective aperture values are displayed. At the dial mark 3f, "F10-40" indicating that aperture values of F10 to 40 can be set is displayed. An index 18 is fixed to the lens barrel 5. The operator rotates the aperture dial 3 to select any one of the dial marks 3a to 3f to the index 18, thereby setting an aperture value by a method indicated by each dial mark. A method for setting an aperture value will be described later.

As shown in FIG. 2, the camera body 20 includes operation switches such as the shutter dial 2, a shutter button 4, a cursor key 6, the auxiliary dial 7 and the determination button 8, the liquid crystal monitor 9, and a viewfinder 23.

Figure 4:
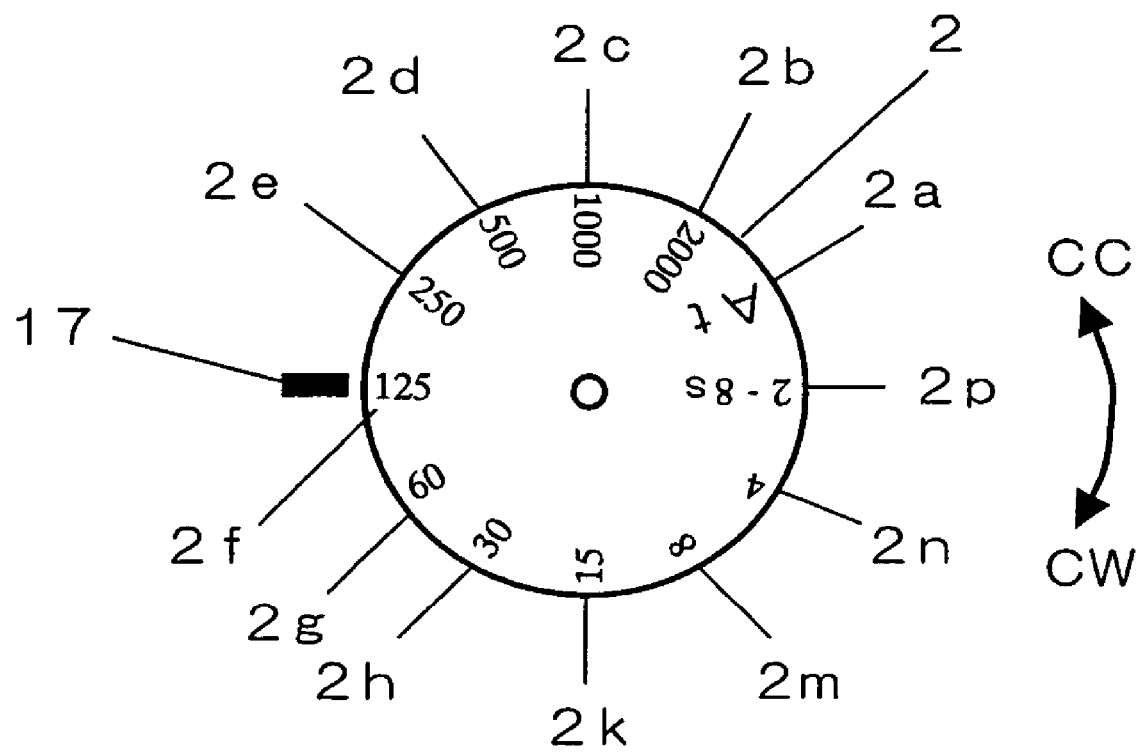
FIG. 4 is a plan view showing a shutter dial of the digital camera.

The shutter dial 2 is an operation switch for selecting a shutter speed of the digital camera 1. The shutter dial 2 can rotate in a horizontal plane. Herein, FIG. 4 is a plan view showing a configuration of the shutter dial 2. As shown in FIG. 4, the shutter dial 2 can rotate in a direction of an arrow CC or CW in the figure. The shutter dial 2 includes a plurality of dial marks 2a to 2p. At the dial mark 2a, "At" indicating that a shutter speed is set automatically is displayed. At the dial marks 2b to 2n, an inverse of each shutter speed is displayed. At the dial mark 2p, "2-8 s" indicating that a shutter speed of ½ to 8 seconds can be set is displayed. An index 17 is fixed to the camera body 20. The operator rotates the shutter dial 2 to select any one of the dial marks 2a to 2p to the index 17, thereby setting a shutter speed by a method indicated by each dial mark. It is preferable that the dial marks 2b to 2n respectively are assigned shutter speeds with a relatively high use frequency, and the dial mark 2p is assigned a plurality of shutter speeds with a relatively low use frequency. A shutter speed can be set by one action of rotating the shutter dial 2, using the dial marks 2b to 2n. Therefore, it is preferable that the dial marks 2b to 2n are assigned shutter speeds with a high use frequency. A method for setting a shutter speed will be described later.

Referring to FIG. 2 again, the shutter button 4 is an operation switch for instructing the digital camera 1 to start taking pictures. The shutter button 4 is placed in the vicinity of the shutter dial 2. Therefore, the operator can start taking pictures immediately after selecting a shutter speed with the shutter dial 2.

Figure 5:
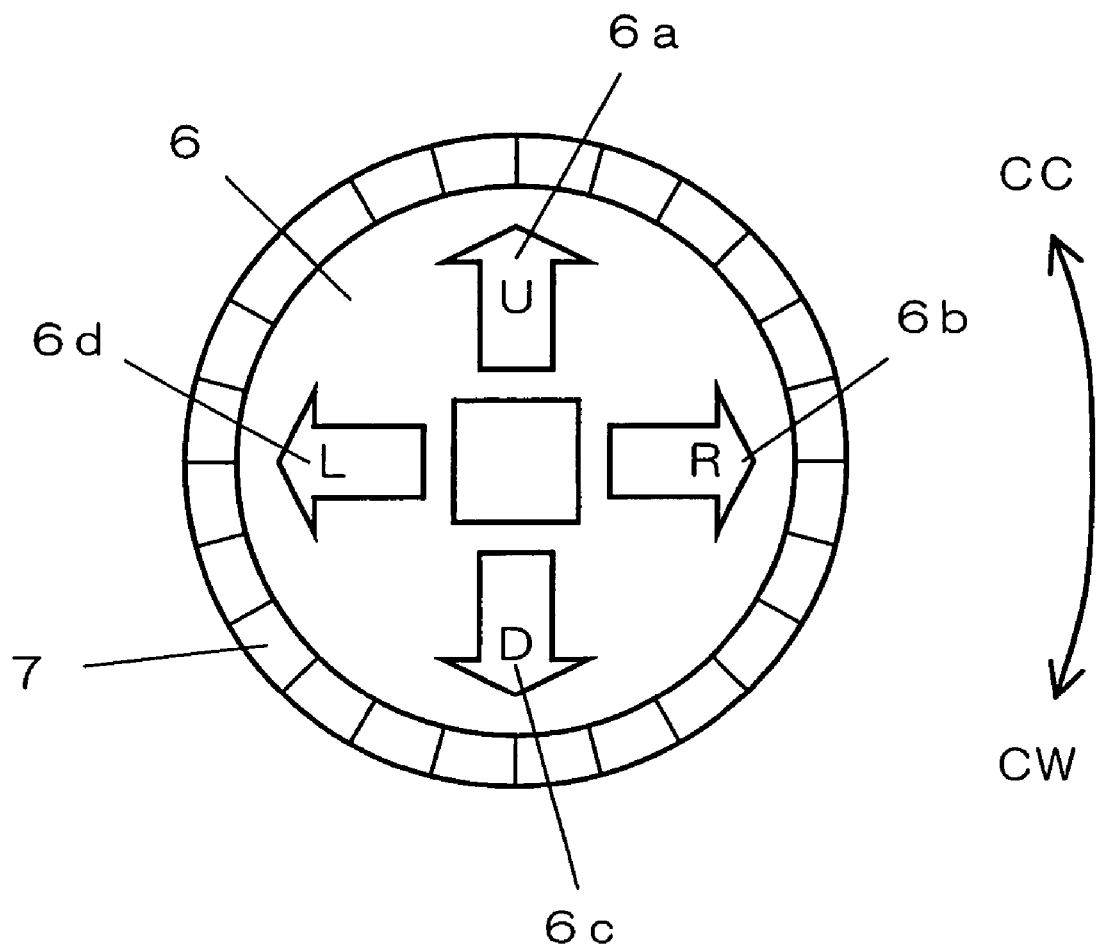
FIG. 5 is a plan view showing an auxiliary dial of the digital camera.

The cursor key 6 and the auxiliary dial 7 are operation switches for moving a cursor displayed on the liquid crystal monitor 9 or changing a setting value. Herein, FIG. 5 is a schematic view showing configurations of the cursor key 6 and the auxiliary dial 7. As shown in FIG. 5, the cursor key 6 is composed of four direction keys 6a to 6d (U(Up), R(Right), D(Down), L(Left)). Furthermore, the auxiliary dial 7 is provided around an outer circumference of the cursor key 6, and can rotate in a direction of an arrow CW (clockwise direction) or CC (counterclockwise direction) in the figure.

In FIG. 2, the determination button 8 is an operation switch for determining an operating condition and the like of the digital camera 1. The liquid crystal monitor 9 is a display for displaying image data generated in an imaging part 12 (described later), an operating condition of the digital camera 1, and the like. The viewfinder 23 is a display through which the operator looks during taking a picture to determine an angle of view of an image.

Figure 6:
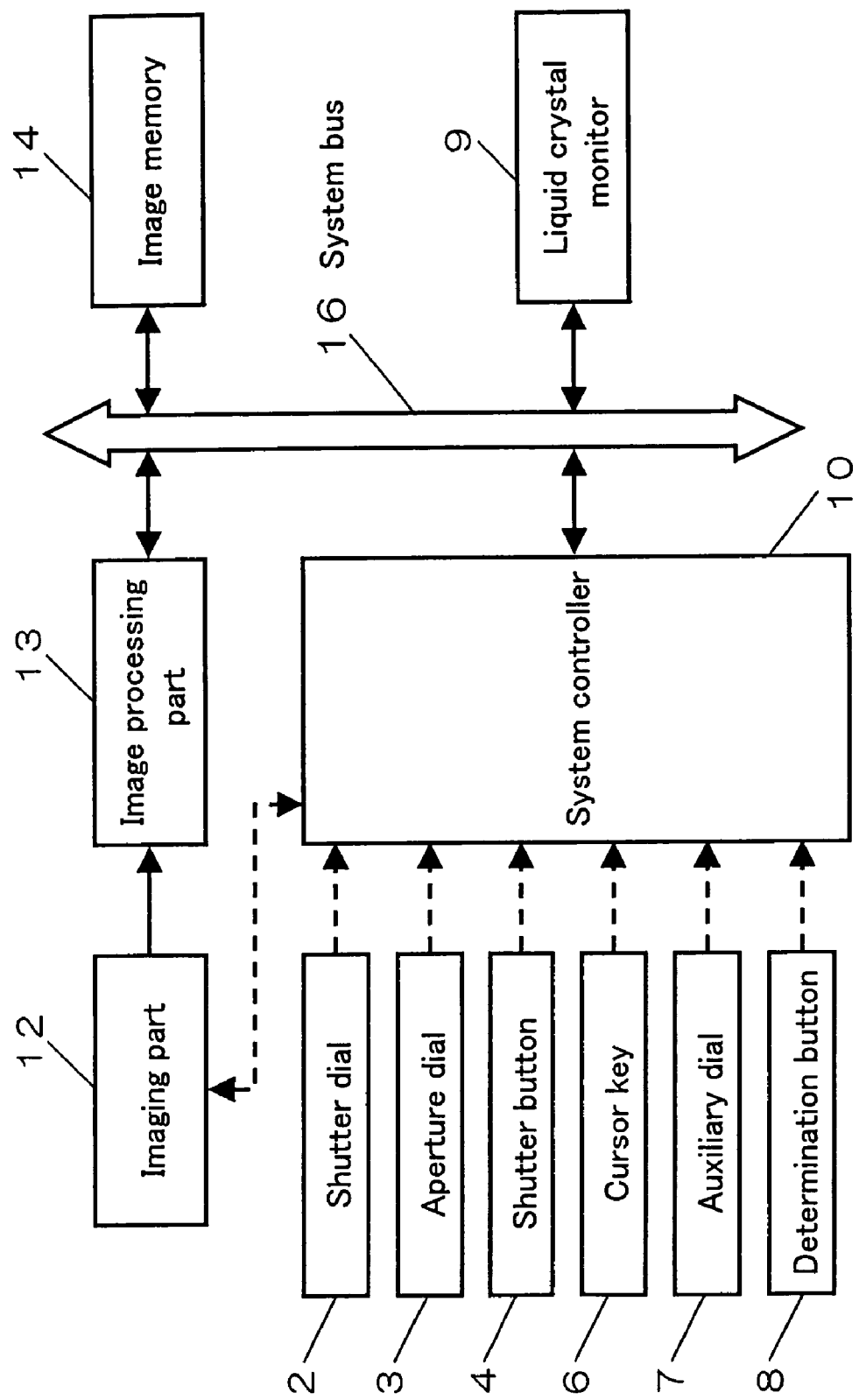
FIG. 6 is a block diagram showing a configuration of the digital camera.

Next, the configuration of an electrical system of the digital camera 1 will be described. FIG. 6 is a block diagram showing the configuration of the digital camera 1 according to Embodiment 1 of the present invention. In FIG. 6, a system controller 10 controls the liquid crystal monitor 9, the imaging part 12, an image processing part 13, an image memory 14, and the like. The system controller 10 performs the above-mentioned control based on the instruction of the operation switches such as the shutter dial 2, the aperture dial 3, the shutter button 4, the cursor key 6, and the auxiliary dial 7. The system controller 10 is composed of a semiconductor circuit and software contained therein.

The imaging part 12 captures a subject to generate image data. The imaging part 12 includes a lens, an aperture mechanism, and an imaging element such as a CCD. The image processing part 13 performs RAW/YC conversion, resolution conversion, compressing processing, and the like with respect to the image data generated in the imaging part 12. Furthermore, the image processing part 13 performs resolution conversion, decompression processing, and the like with respect to the image data received from the image memory 14. The image memory 14 stores the image data processed in the image processing part 13, and supplies these data to the system controller 10 and the image processing part 13. A system bus 16 is used for transmitting image data and a control signal in the digital camera 1.

The shutter dial 2 is an example of a first operation switch of the present invention. The liquid crystal monitor 9 is an example of a display of the present invention. The configuration composed of the auxiliary dial 7 and the determination button 8 is an example of a second operation switch of the present invention. The system controller 10 is an example of a controller of the present invention. The digital camera 1 is an example of an electronic appliance of the present invention. In this case, the shutter speed is an example of a setting value in the present invention. The state where any one of the dial marks 2b to 2n of the shutter dial 2 is oriented to the index 17 is an example of a first state in the present invention. The state where the dial mark 2*p* of the shutter dial 2 is oriented to the index 17 is an example of a second state in the present invention.

Furthermore, the aperture dial 3 is an example of the first operation switch of the present invention. In this case, the aperture value is an example of a setting value in the present invention. The state where any one of the dial marks 3*b* to 3*e* of the aperture dial 3 is oriented to the index 18 is an example of the first state in the present invention. The state where the dial mark 3*f* of the aperture dial 3 is oriented to the index 18 is an example of the second state in the present invention.

The operation of the digital camera 1 based on the above configuration will be described below, regarding a setting operation of a shutter speed and a setting operation of an aperture value.

(Setting of a Shutter Speed)

Figure 7:
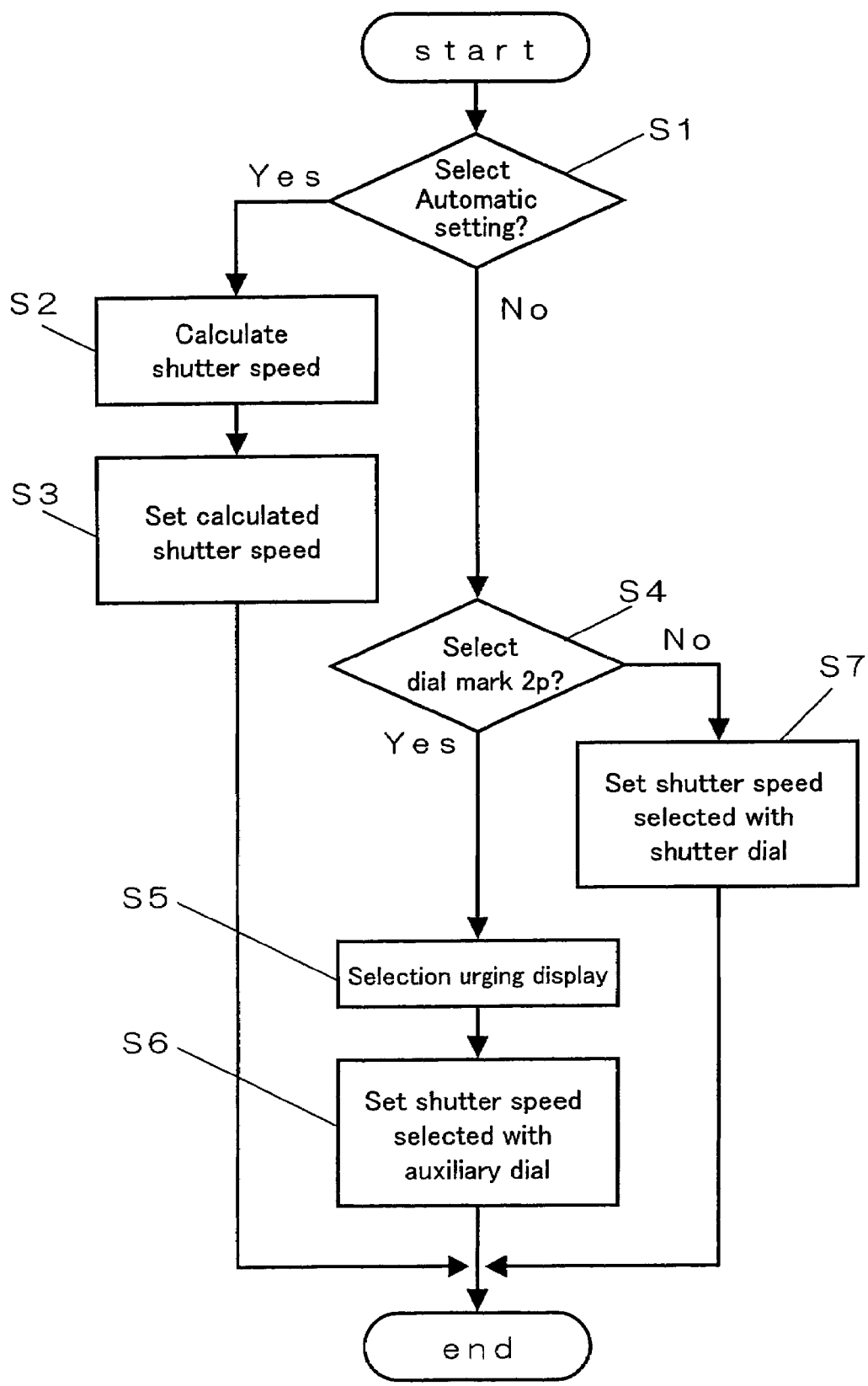
FIG. 7 is a flow chart illustrating an operation of the digital camera.

Hereinafter, the operation of setting a shutter speed of the digital camera 1 will be described. FIG. 7 is a flow chart illustrating the operation thereof.

As shown in FIG. 7, when the operator operates the shutter dial 2, the digital camera 1 starts a setting operation of a shutter speed. Then, the system controller 10 detects whether or not the operator has selected automatic setting with the shutter dial 2 (S1). More specifically, the system controller 10 detects whether or not the dial mark 2*a* has been oriented to the index 17.

When the dial mark 2*a* has been oriented to the index 17 (YES in S1), based on a currently set aperture value and an exposure amount detected by imaging part 12, the system controller 10 calculates a shutter speed suitable for the exposure amount (S2). Next, the system controller 10 sets the calculated shutter speed as an operating condition (S3). More specifically, the system controller 10 transmits information on the calculated shutter speed to the imaging part 12, and controls the imaging part 12 so as to allow it to operate at the calculated shutter speed. Then, the system controller 10 displays the calculated shutter speed on the liquid crystal monitor 9, as shown in FIG. 8. FIG. 8 is a schematic view showing a screen displayed on the liquid crystal monitor 9. A background image D1 is image data generated in the imaging part 12. A shutter speed display D2 and an aperture value display D3 are displayed so as to be overlapped with the background screen D1. In FIG. 8, the shutter speed display D2 shows the case where a shutter speed is 1/125 seconds. In the shutter speed display D2, character portions are displayed in black. Owing to the above operation, the digital camera 1 sets the automatically calculated shutter speed (1/125 seconds in this example) as an operating condition.

On the other hand, when the dial mark 2*a* has not been oriented to the index 17 (No in S1), the system controller 10 detects whether or not the shutter dial 2 has selected the second state (S4). More specifically, the system controller 10 detects whether or not the dial mark 2*p* has been oriented to the index 17.

When the dial mark 2*p* has not been oriented to the index 17 (No in S4), the system controller 10 detects that the shutter dial 2 has selected the first state. Then, the system controller 10 sets the shutter speed selected with the shutter dial 2 as an operating condition (S7). More specifically, the system controller 10 transmits information on the shutter speed selected with the shutter dial 2 to the imaging part 12, and controls the imaging part 12 so as to allow it to operate at that shutter speed. Then, the system controller 10 displays the shutter speed selected with the shutter dial 2 on the liquid crystal monitor 9, as shown in FIG. 8. For example, as shown in FIG. 4, in the case where the dial mark 2*f* of the shutter dial 2 has been oriented to the index 17, the system controller 10 sets the shutter speed at 1/125 seconds. Then, the system controller 10 allows the liquid crystal monitor 9 to display "1/125" as the shutter speed display D2, as shown in FIG. 8, thereby informing the operator that the shutter speed is 1/125 seconds. In the shutter speed display D2 at this time, character portions are displayed in black. Owing to the above operation, the digital camera 1 sets the shutter speed (1/125 seconds in this example) selected with the shutter dial 2 as an operating condition.

Figure 9A:
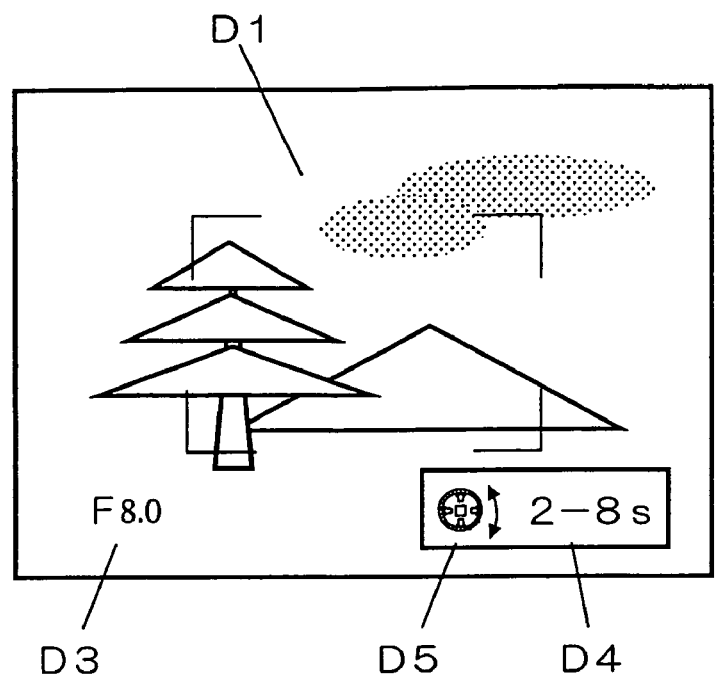
FIG. 9 is a schematic view showing a screen display of a liquid crystal monitor of the digital camera.

On the other hand, in Step S4 shown in FIG. 7, when the dial mark 2*p* has been oriented to the index (Yes in S4), the system controller 10 detects that the shutter dial 2 has selected the second state. Then, the system controller 10 allows the liquid crystal monitor 9 to show a display for prompting the operator to select a shutter speed using the auxiliary dial 7 and the determination button 8 (S5). Herein, FIG. 9(*a*) is a schematic view showing a screen of the liquid crystal monitor 9 in Step S5. In FIG. 9(*a*), a selection prompting display D4 and an icon D5 are displayed so as to be overlapped with the background image D1. The icon D5 is displayed in the vicinity of the selection prompting display D4. The operator sees the selection prompting display D4 to recognize that a shutter speed should be set in a range of ½ to 8 seconds. Furthermore, the icon D5 is an image showing the auxiliary dial 7. Therefore, owing to the display of the icon D5, the operator can understand through intuition that the auxiliary dial 7 should be used.

Next, the system controller 10 assigns the function of changing a shutter speed to the auxiliary dial 7, and assigns the function of determining a shutter speed to the determination button 8. More specifically, the system controller 10 sets an operation mode in which a shutter speed can be selected with the auxiliary dial 7 and the determination button 8. The auxiliary dial 7 generally has various functions of moving a cursor displayed on the liquid crystal monitor 9, changing a setting value, and the like. Due to this assignment, as soon as the dial mark 2*p* of the shutter dial 2 is oriented to the index 17, the auxiliary dial 7 is specialized to the function of changing a shutter speed. This also applies to the determination button 8.

Figure 10:
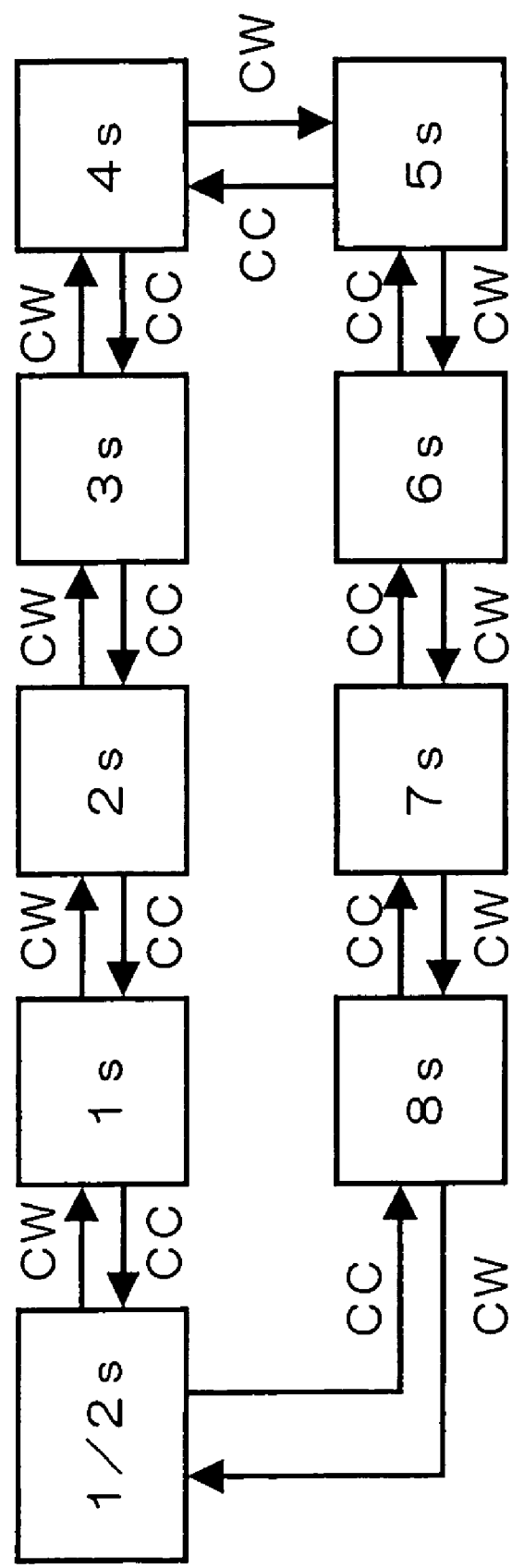
FIG. 10 is a state transition diagram of a settable shutter speed of the digital camera.

Next, when the operator operates the auxiliary dial 7 in accordance with these instructions, the system controller 10 deletes the selection prompting display D4 and the icon D5, and allows the shutter speed display D2 to be displayed in a portion where the selection prompting display D4 and the icon D5 have been displayed. Furthermore, the system controller 10 changes the shutter speed display D2 in accordance with the movement of the auxiliary dial 7. Herein, FIG. 10 is a state transition diagram of the shutter speed display D2. When the auxiliary dial 7 rotates in the CW direction shown in FIG. 5, the system controller 10 changes the shutter speed display D2 in an ascending order: "½ s"→"1 s"→"2 s" . . . in accordance with the rotation of the auxiliary dial 7. When the auxiliary dial 7 further rotates in the CW direction after the shutter speed display D2 becomes "8 s", the system controller 10 returns the shutter speed display D2 to "½s". On the contrary, when the auxiliary dial 7 rotates in the CC direction shown in FIG. 5, the system controller 10 changes the shutter speed display D2 in a descending order: "8 s"→"7 s"→"6 s" . . . in accordance with the rotation of the auxiliary dial 7. Then, when the auxiliary dial 7 further rotates in the CC direction after the shutter speed display D2 becomes "½s", the system controller 10 returns the shutter speed display D2 to "8 s".

Figure 9B:
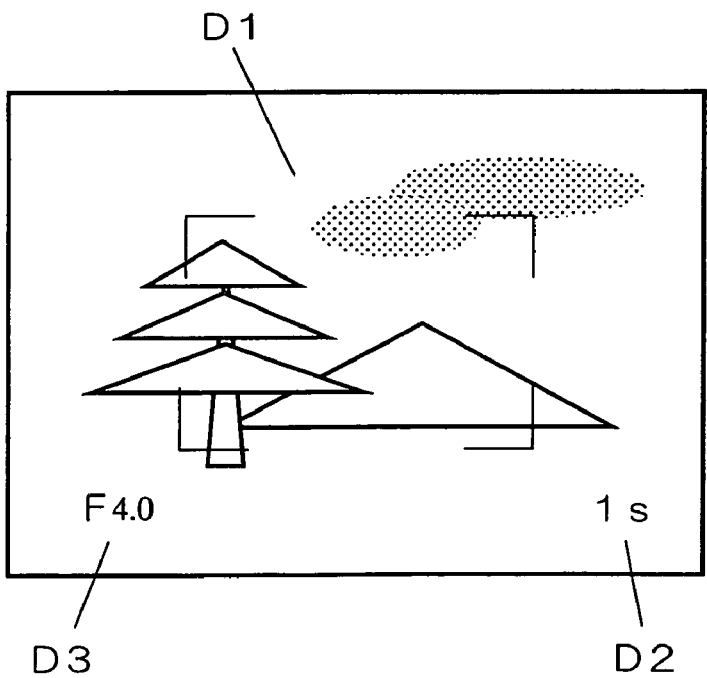

FIG. 9(b) is a schematic view showing a screen displayed on the liquid crystal monitor 9 when the shutter speed display D2 is being changed. In FIG. 9(b), the shutter speed display D2 is "1 s". Therefore, when the auxiliary dial 7 rotates in the CW direction shown in FIG. 5, the shutter speed display D2 is changed to "2 s". On the contrary, when the auxiliary dial 7 rotates in the CC direction, the shutter speed display D2 is changed to "½ s". In the shutter speed display D2, character portions are displayed in red. More specifically, in the present embodiment, the character portions in the shutter speed display D2 are displayed in black in the case of automatic setting or selecting a shutter speed with the dial marks 2b to 2n, as shown in FIG. 8; therefore, the character portions are displayed in a different embodiment. Because of this, the operator easily can recognize that the shutter speed display D2 is being changed with the auxiliary dial 7; in other words, a shutter speed has not been set. The embodiment of a display color of the shutter speed display D2 is not limited to black or red.

Next, the operator selects a desired shutter speed with the auxiliary dial 7, confirms the shutter speed display D2 at this time, and presses the determination button 8. Then, the system controller 10 sets the shutter speed selected with the auxiliary dial 7 and the determination button 8 as an operating condition (S6). Furthermore, the system controller 10 changes the shutter speed display D2 displayed on the liquid crystal monitor 9 to black. More specifically, the shutter speed display D2 is displayed in a different embodiment from that of the shutter speed display D2 when a shutter speed has not been set. Because of this, the operator easily can recognize that the shutter speed display D2 cannot be changed even if the auxiliary dial 7 is rotated, and in other words, the setting of a shutter speed has been established. Owing to the above operation, the digital camera 1 sets the shutter speed (1 second in this example) selected with the auxiliary dial 7 and the determination button 8 as an operating condition.

As described above, the operator can set the shutter speed of the digital camera 1, and change the shutter speed again by rotating the shutter dial 7 (the process returns to "start" in FIG. 7).

The shutter speed display D2 is an example of a setting value displayed on a display. The selection prompting display D4 is an example of a display for prompting the operator to select a setting value with the second operation switch of the present invention. The icon D5 is an example of a picture symbol of the present invention.

(Setting of an Aperture Value)

Figure 11:
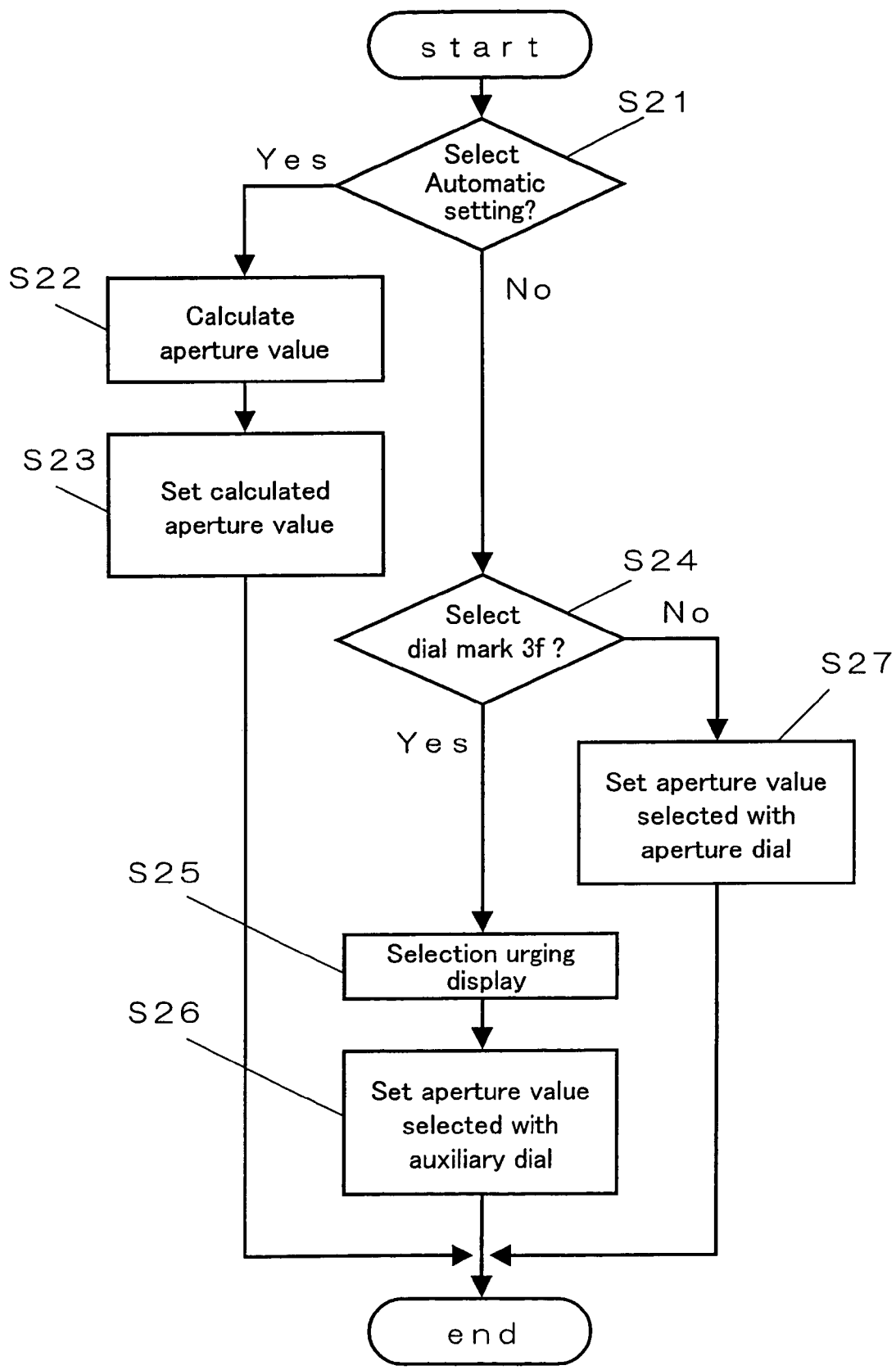
FIG. 11 is a flow chart illustrating an operation of the digital camera.

Next, the operation of setting an aperture value of the digital camera 1 will be described below. An aperture value will be described briefly since it can be set in the same way as in the setting of a shutter speed. FIG. 11 is a flow chart illustrating the operation thereof.

As shown in FIG. 11, when the operator operates the aperture dial 3, the digital camera 1 starts a setting operation of an aperture value. Then, the system controller 10 detects whether or not the aperture dial 3 has selected automatic setting (S21). More specifically the system controller 10 detects whether or not the dial mark 3a shown in FIG. 3 has been oriented to the index 18.

Figure 12:
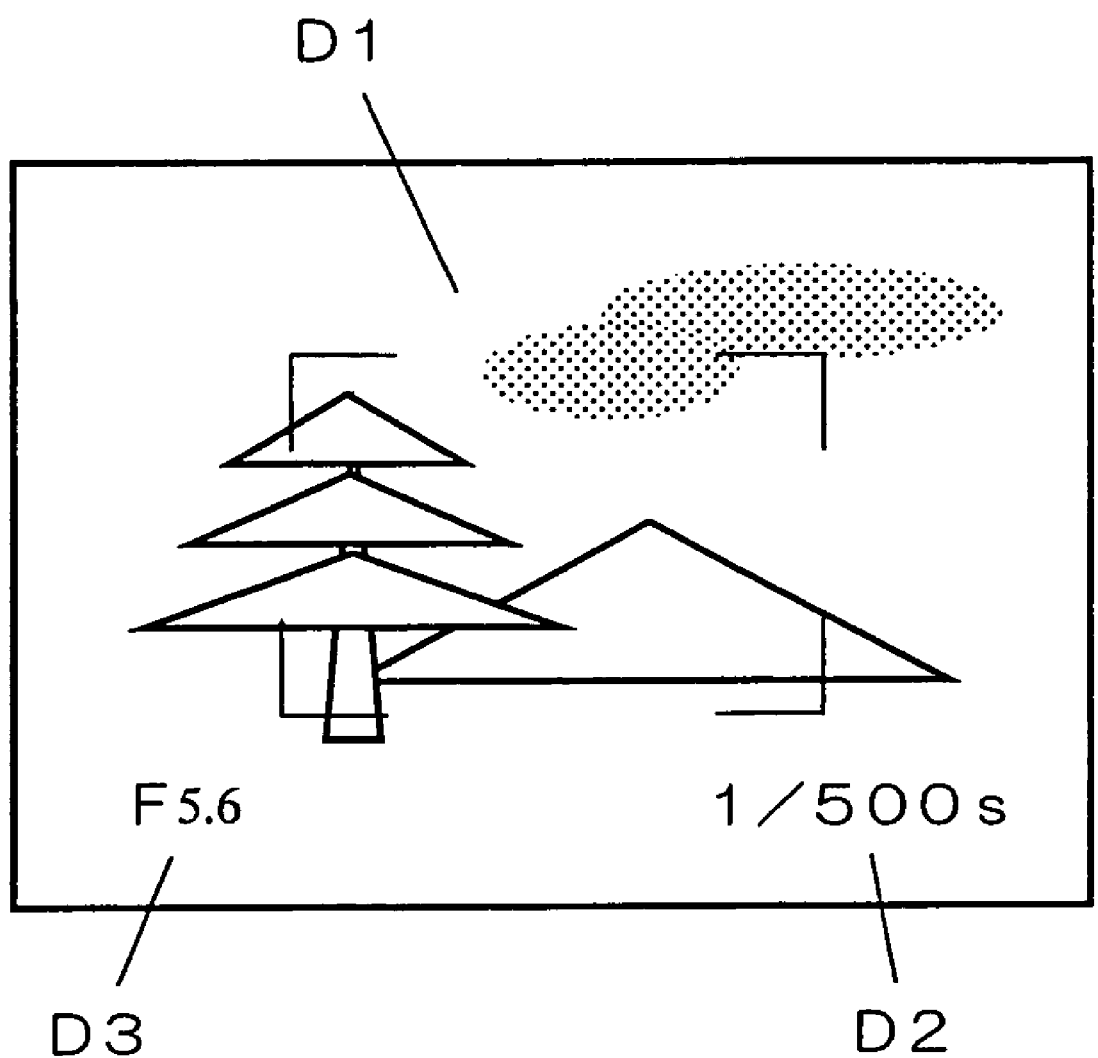
FIG. 12 is a schematic view showing a screen display of a liquid crystal monitor of the digital camera.

When the dial mark 3a has been oriented to the index 18 (YES in S21), based on a currently set shutter speed and an exposure amount detected by imaging part 12, the system controller 10 calculates an aperture value suitable for the exposure amount (S22). Next, the system controller 10 sets the calculated aperture value as an operating condition (S23). Then, the system controller 10 displays the calculated aperture value on the liquid crystal monitor 9, as shown in FIG. 12. FIG. 12 is a schematic view showing a screen displayed on the liquid crystal monitor 9. In FIG. 12, the aperture value display D3 shows the case where an aperture value is F5.6. Owing to the above operation, the digital camera 1 sets the automatically calculated aperture value (F5.6 in this example) as an operating condition.

On the other hand, when the dial mark 3a has not been oriented to the index 18 (No in S21), the system controller 10 detects whether or not the aperture dial 3 has selected the second state (S24). More specifically, the system controller 10 detects whether or not the dial mark 3f has been oriented to the index 18.

When the dial mark 3f has not been oriented to the index 18 (No in S24), the system controller 10 detects that the aperture dial 3 has selected the first state. Then, the system controller 10 sets the aperture value selected with the aperture dial 3 as an operating condition (S27). Then, the system controller 10 displays the aperture value selected with the aperture dial 3 on the liquid crystal monitor 9, as shown in FIG. 12. For example, as shown in FIG. 3, when the dial mark 3c of the aperture dial 3 has been oriented to the index 18, the system controller 10 sets the aperture value at F5.6. Then, the system controller 10 allows the liquid crystal monitor 9 to display "F5.6" as the aperture value display D3, as shown in FIG. 12, thereby informing the operator that the aperture value is F5.6. Owing to the above operation, the digital camera 1 sets the aperture value (F5.6 in this example) selected with the aperture dial 3 as an operating condition.

Figure 13A:
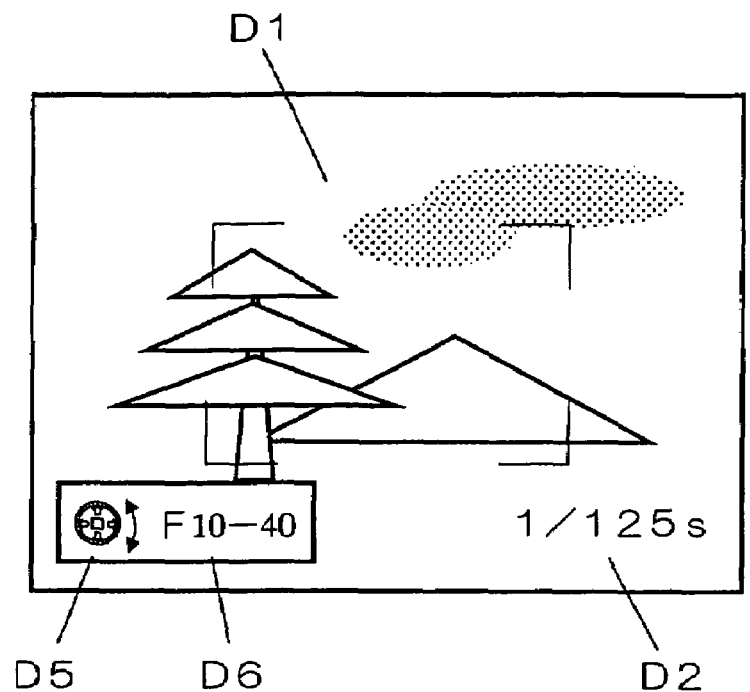
FIG. 13 is a schematic view showing a screen display of a liquid crystal monitor of the digital camera.

On the other hand, in Step S24 shown in FIG. 11, when the dial mark 3f has been oriented to the index 18 (Yes in S24), the system controller 10 allows the liquid crystal monitor 9 to show a display for prompting the operator to select an aperture value using the auxiliary dial 7 and the determination button 8 (S25). Herein, FIG. 13(a) is a schematic view showing a screen of the liquid crystal monitor 9 in Step S25. In FIG. 13(a), a selection prompting display D6 and an icon D5 are displayed so as to be overlapped with the background image D1. The icon D5 is displayed in the vicinity of the selection prompting display D6. The operator sees the selection prompting display D6 to recognize that an aperture value should be set in a range of F10 to F40.

Figure 13B:
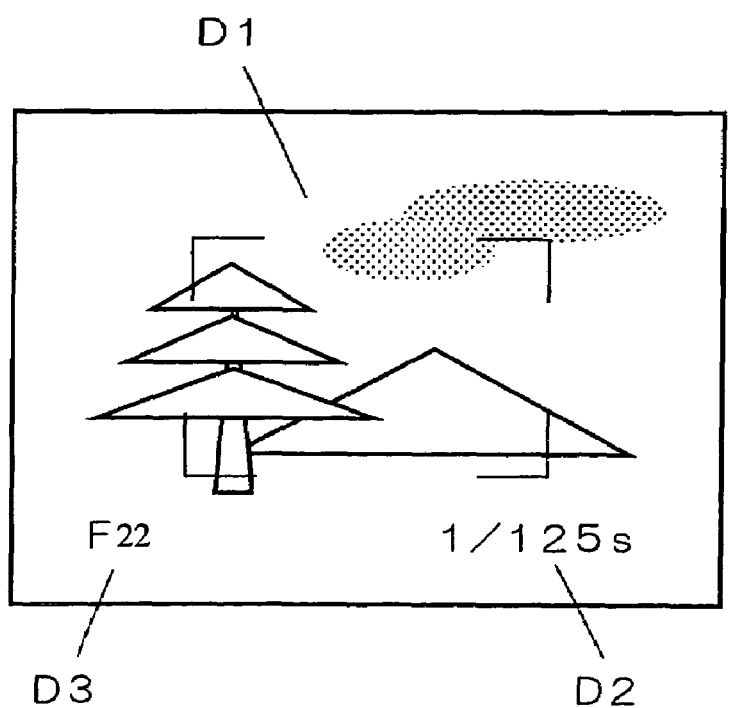
Figure 14:
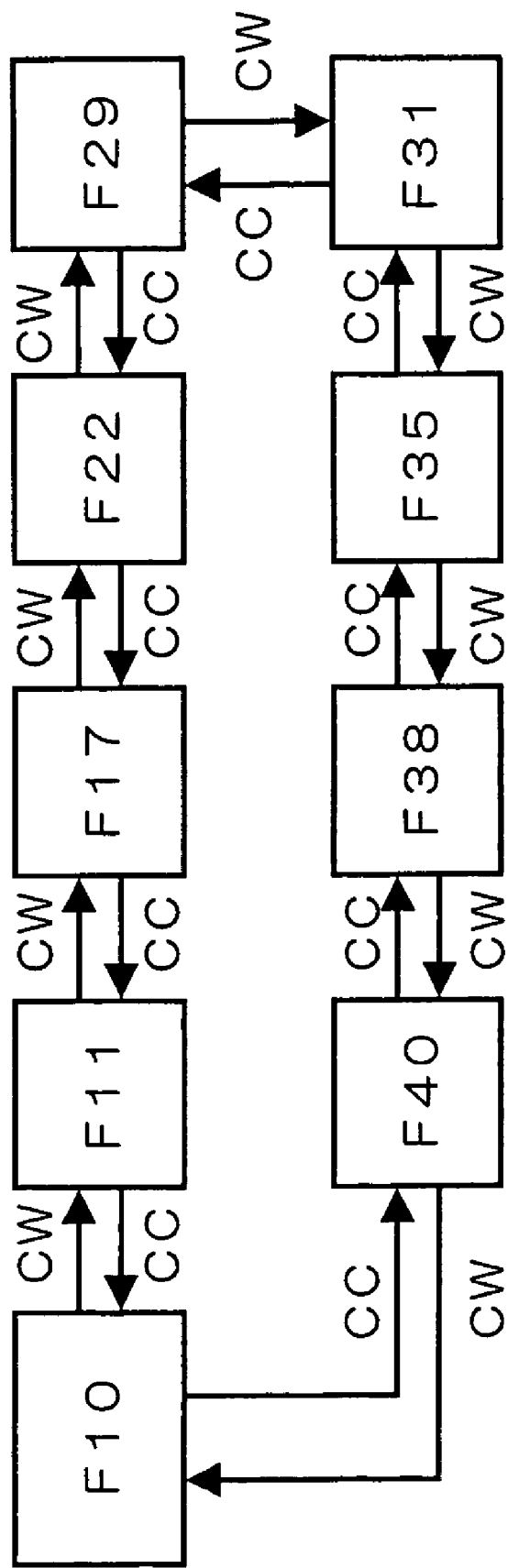
FIG. 14 is a state transition diagram of a settable shutter speed of the digital camera.

Next, when the operator operates the auxiliary dial 7 in accordance with these instructions, the system controller 10 deletes the selection prompting display D6 and the icon D5, and allows the aperture value display D3 to be displayed in a portion where the selection prompting display D6 and the icon D5 have been displayed. Furthermore, the system controller 10 changes the shutter speed display D3 in accordance with the movement of the auxiliary dial 7. Herein, FIG. 14 is a state transition diagram of the aperture value display D3. When the auxiliary dial 7 rotates in the CW direction shown in FIG. 5, the system controller 10 changes the aperture value display D3 in an ascending order: "F10"→"F11"→"F17" . . . in accordance with the rotation of the auxiliary dial 7. When the auxiliary dial 7 further rotates in the CW direction after the aperture value display D3 becomes "F40", the system controller 10 returns the shutter speed display D3 to "F10". On the contrary, when the auxiliary dial 7 rotates in the CC direction shown in FIG. 5, the system controller 10 changes the aperture value display D3 in a descending order: "F40"→"F38"→"F35" . . . in accordance with the rotation of the auxiliary dial 7. Then, when the auxiliary dial 7 further rotates in the CC direction after the aperture value display D3 becomes "F10", the system controller 10 returns the aperture value display D3 to "F40". FIG. 13(*b*) is a schematic view showing a screen displayed on the liquid crystal monitor 9 when the aperture value display D3 is being changed. In FIG. 13(*b*), the aperture value display D3 is "F22". Therefore, when the auxiliary dial 7 rotates in the CW direction shown in FIG. 5, the aperture value display D3 is changed to "F29". On the contrary, when the auxiliary dial 7 rotates in the CC direction, the aperture value display D3 is changed to "F17". In the aperture value display D3, character portions are displayed in red.

Next, the operator selects a desired aperture value with the auxiliary dial 7, confirms the aperture value display D3 at this time, and presses the determination button 8. Then, the system controller 10 sets the aperture value selected with the auxiliary dial 7 and the determination button 8 as an operating condition (S26). Furthermore, the system controller 10 changes the aperture value display D3 displayed on the liquid crystal monitor 9 in black. Owing to the above operation, the digital camera 1 sets the aperture value (F22 in this example) selected with the auxiliary dial 7 and the determination button 8 as an operating condition.

As described above, the operator can set the aperture value of the digital camera 1, and change again the aperture value by rotating the aperture dial 3 (the process returns to "start" in FIG. 11).

The aperture value display D3 is an example of a setting value displayed on a display. The selection prompting display D6 is an example of a display for prompting the operator to select a setting value with the second operation switch of the present invention.

As described above, the digital camera 1 according to Embodiment 1 of the present invention includes the shutter dial 2 for selecting the first state assigned one shutter speed or the second state assigned a plurality of shutter speeds, the liquid crystal monitor 9 for displaying a shutter speed assigned to the second state when the shutter dial 2 selects the second state, the auxiliary dial 7 for selecting any one of shutter speeds displayed on the liquid crystal monitor 9, and the system controller 10 for setting the shutter speed selected with the auxiliary dial 7 as an operating condition when the shutter dial selects the dial mark 2*p*, while setting the shutter speed assigned to a dial mark (any one of the dial marks 2*b* to 2*n*) as an operating condition when the shutter dial 2 selects any one of the dial marks 2*b* to 2*n*.

Thus, the digital camera 1 has a satisfactory operability since a shutter speed can be changed mechanically with the shutter dial 2. Then, shutter speeds other than those which can be set with the shutter dial 2 can be set by changing the shutter speed displayed on the liquid crystal monitor 9 with the auxiliary dial 7, so that a number of shutter speeds can be set.

Furthermore, the digital camera 1 according to Embodiment 1 of the present invention assigns a shutter speed with a relatively high use frequency to the dial marks 2*b* to 2*n*, and assigns a shutter speed with a relatively low use frequency to the dial mark 2*p*. Because of this, the operator easily can set a shutter speed with a high use frequency (by one action of rotating the shutter dial 2). On the other hand, regarding a shutter speed with a low use frequency, a number of shutter speeds can be configured so as to be selected using the auxiliary dial 7.

Furthermore, the system controller 10 of the digital camera 1 according to Embodiment 1 of the present invention is characterized by allowing the liquid crystal monitor 9 to display the selection prompting display D4 for prompting the operator to select a shutter speed, when the shutter dial 2 selects the dial mark 2*p*. Thus, owing to the display of the selection prompting display D4, the operator easily can understand an operation method. More specifically, the operator easily can understand that a shutter speed should be selected.

Furthermore, the selection prompting display D4 of the digital camera 1 according to Embodiment 1 of the present invention is characterized by including the icon D5 representing the shape of the auxiliary dial 7. Thus, the selection prompting display D4 includes the icon D5 representing the shape of the auxiliary dial 7, so that the operator easily can understand that the auxiliary dial 7 is used for selecting a shutter speed.

Furthermore, before and after the system controller 10 of the digital camera 1 according to Embodiment 1 of the present invention sets the shutter speed selected with the auxiliary dial 7 as an operating condition, the display embodiment of the shutter speed display D2 changes from red to black. Thus, the display embodiment of the shutter speed display D2 is varied before and after setting with the auxiliary dial 7, so that the operator easily can grasp whether or not setting with the auxiliary dial 7 has been completed. More specifically, it can be determined easily that setting with the auxiliary dial 7 has not been completed if the shutter speed display D2 is red, and setting with the auxiliary dial 7 has been completed if the shutter speed display D2 is black.

Furthermore, the liquid crystal monitor 9 of the digital camera 1 according to Embodiment 1 of the present invention displays the shutter speed display D2 representing the shutter speed assigned to the dial mark 2*p* in a different embodiment from that of the shutter speed display D2 representing the shutter speed assigned to any one of the dial marks 2*b* to 2*n*. Because of this, the operator easily can grasp which of the shutter dial 2 and the auxiliary dial 7 has been used for setting a shutter speed, or which of the shutter dial 2 and the auxiliary dial 7 should be used for setting a shutter speed.

In the above, regarding setting of an aperture value, the aperture dial 3 only needs to be used in place of the shutter dial 2, so that the description thereof will be omitted.

In Embodiment 1 of the present invention, in order to set a shutter speed or an aperture value, the auxiliary dial 7 is used in addition to the shutter dial 2 and the aperture dial 3. However, the auxiliary dial 7 has the other applications in addition to setting of a shutter speed or an aperture value. Therefore, even if the auxiliary dial 7 has no function of setting a shutter speed or an aperture value, it is required in the digital camera 1. Therefore, the number of components will not increase even though the auxiliary dial 7 is used so as to increase the number of settable shutter speeds or aperture values. This is advantageous compared with the prior art.

Furthermore, in Embodiment 1 of the present invention, the auxiliary dial 7 is used so as to set a shutter speed or an aperture value. However, the present invention is not limited thereto, and the shutter speed or the aperture value may be configured so as to be set using the cursor key 6. In the case of using the cursor key 6, when the cursor key 6 is pressed once, the setting state of a shutter speed or an aperture value can be changed by 1. Therefore, the operator can set a desired setting value exactly. More specifically, in the case of the auxiliary dial 7, the operator may rotate the auxiliary dial 7 too much, thereby changing a setting value to the one exceeding a desired setting value. In the case of the cursor key 6, a desired setting value can be set exactly if the number of pressing a key is correct.

Furthermore, in Embodiment 1 of the present invention, although the liquid crystal monitor 9 is used as a display, the present invention is not limited thereto. An organic EL display or the like may be used as long as it can display an image.

Furthermore, in Embodiment 1 of the present invention, the display embodiment of the shutter speed display D2 is changed in each state by varying a color. However, the present invention is not limited thereto. A display embodiment may be changed, for example, by changing the background color of the shutter speed display D2, surrounding the shutter speed display D2 with a frame, or allowing the shutter speed display D2 to flash.

Furthermore, in the present embodiment, although a digital camera is illustrated as an example of an electronic appliance, the present invention is not limited to the digital camera. The present invention is applicable to an electronically controlled silver-halide camera.

Embodiment 2

In Embodiment 1 of the present invention, the case has been described where the present invention is applied for setting a shutter speed and an aperture value of the digital camera 1. In contrast, in Embodiment 2, the case will be described where the present invention is applied for setting a transmission destination address of a mobile telephone terminal 201.

Even the mobile telephone terminal 201 is being miniaturized and provided with increased functionality in the same way as in the digital camera 1. Thus, there is a demand for a number of kinds of settings, using operation components and the like in a smallest possible size and number. Furthermore, there is a demand that a period of time required for setting is short, and operability is satisfactory. In particular, there is a demand for the enhancement of operability with respect to setting of a transmission destination address. Hereinafter, the mobile telephone terminal 201 according to Embodiment 2 of the present invention satisfying such a demand will be described.

Figure 15:
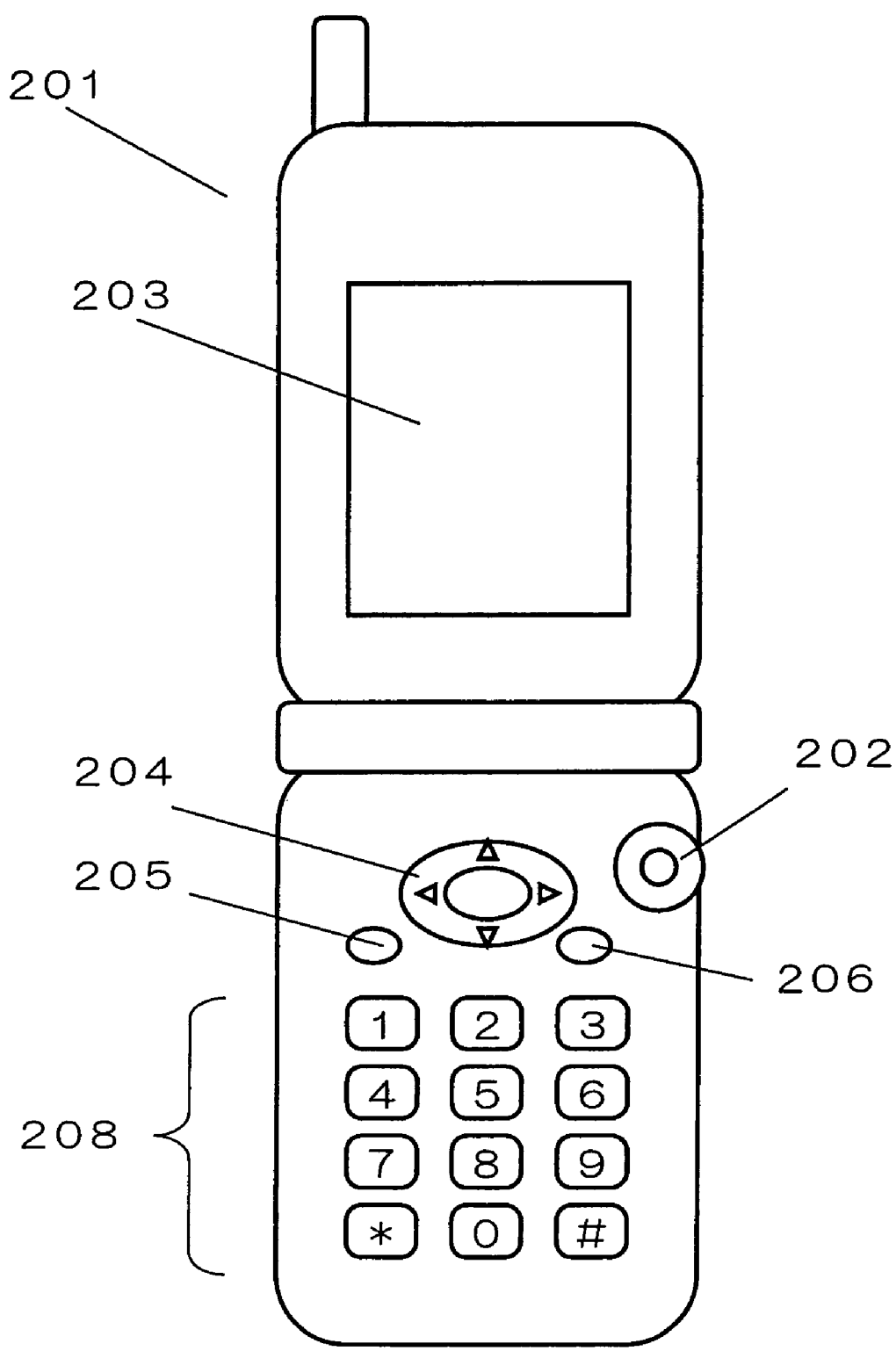
FIG. 15 is a schematic view showing an external appearance of a mobile telephone terminal according to Embodiment 2 of the present invention.

FIG. 15 is a schematic view showing an external appearance of the mobile telephone terminal 201 according to Embodiment 2 of the present invention. The mobile telephone terminal 201 includes operation switches such as a dial 202, a cursor key 204, a communication start button 205, a communication completion button 206, and a ten key pad 208, and a liquid crystal monitor 203. The dial 202 is an operation switch for selecting a transmission destination address. Apart of an outer circumference of the dial 202 protrudes from an end side of a body of the mobile telephone terminal 201. Therefore, the operator operates it by touching the protruding part, thereby rotating the dial 202 easily. The cursor key 204 is an operation switch for moving a cursor displayed on the liquid crystal monitor 203. The communication start button 205 is used for starting the transmission of data to a selected transmission destination address. The communication completion button 206 is used for completing the communication. The ten key pad 208 is an operation switch for inputting a character, a number, or a symbol.

Figure 16:
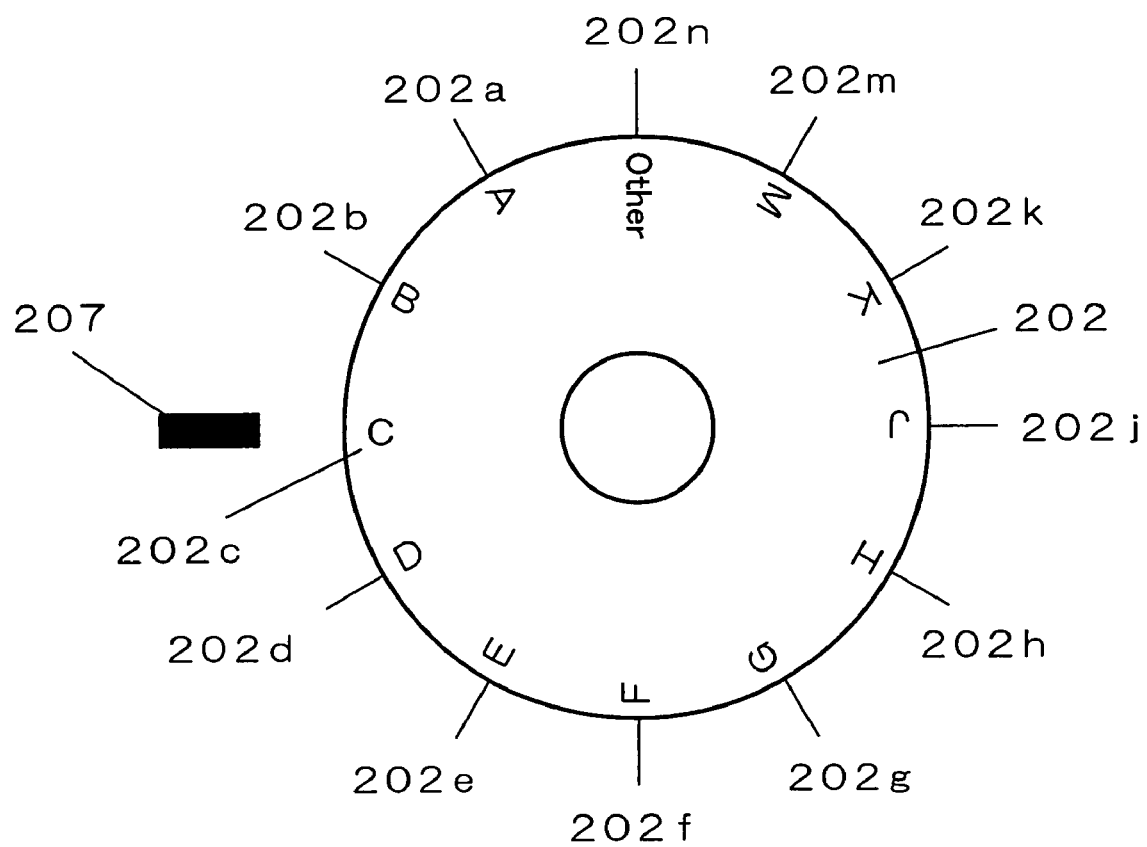
FIG. 16 is a plan view showing a dial of the mobile telephone terminal.

FIG. 16 is a schematic view showing an external appearance of the dial 202. An index 207 is fixed to the mobile telephone terminal 201. Dial marks 202a to 202m respectively are assigned transmission destination addresses, and when any one of the dial marks 202a to 202m is oriented to the index 207, the transmission destination address assigned to that dial mark is set. Furthermore, a dial mark 202n is assigned a plurality of transmission destination addresses. When the dial mark 202n is oriented to the index 207, any one of the transmission destination addresses assigned to the dial mark 202n can be set using the cursor key 204.

Figure 17:
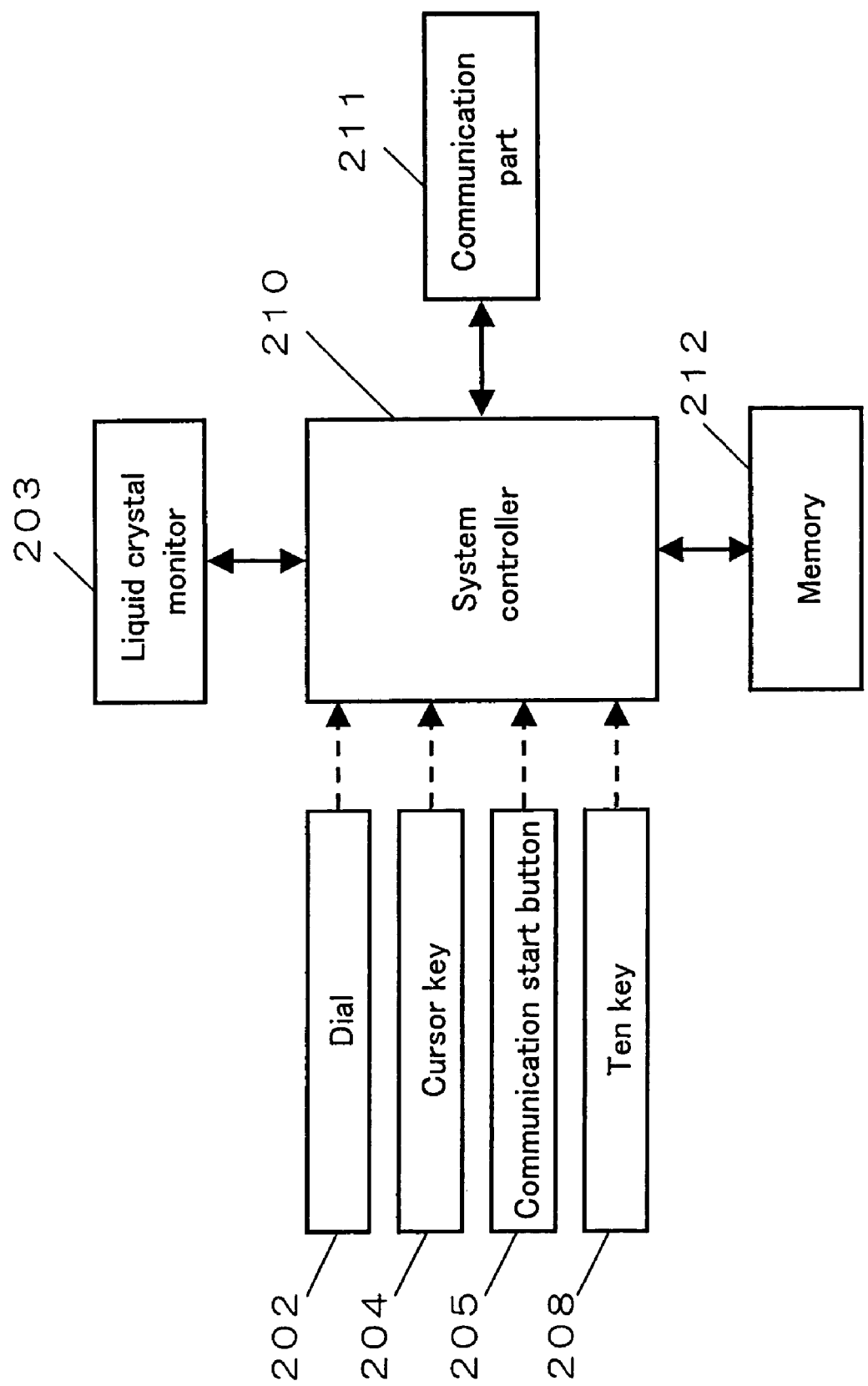
FIG. 17 is a block diagram showing a configuration of the mobile telephone terminal.

FIG. 17 is a block diagram showing a configuration of the mobile telephone terminal 201 according to Embodiment 2 of the present invention. A system controller 210 controls the entire system of a liquid crystal monitor 203, a communication part 211, and the like. The system controller 210 receives a control signal from the operation switches such as the dial 202, the cursor key 204, the communication start button 205, and the ten key pad 208, and controls the entire system. A communication part 211 transmits/receives data with respect to a base station of the mobile telephone system. The communication part 211 includes an antenna, a modulator, an amplifier, and the like. The memory 212 stores a transmission destination address, and the like. The operator operates the ten key pad 208, thereby storing a transmission destination address in the memory 212. Furthermore, the operator can determine freely which transmission destination address should be assigned to the dial marks 202a to 202m, and the dial marks 202a to 202m may be successively assigned addresses with a high transmission frequency. The correspondence between the dial marks 202a to 202m and the transmission destination addresses assigned by the operator is stored in the memory 212 by the system controller 210. A transmission destination address not assigned to the dial marks 202a to 202m by the operator is stored in the memory 212 as the one assigned to the dial mark 202n.

The dial 202 is an example of the first operation switch of the present invention. The liquid crystal monitor 203 is an example of the display of the present invention. The cursor key 204 is an example of the second operation switch of the present invention. The system controller 210 is an example of the controller of the present invention. The mobile telephone terminal 201 is an example of the electronic appliance of the present invention. In this case, a transmission destination address is an example of a setting value of the present invention. The state where any one of the dial marks 202a to 202m of the dial 202 is oriented to the index 207 is an example of the first state in the present invention. The state where the dial mark 202n of the dial 202 is oriented to the index 17 is an example of the second state in the present invention.

Figure 18:
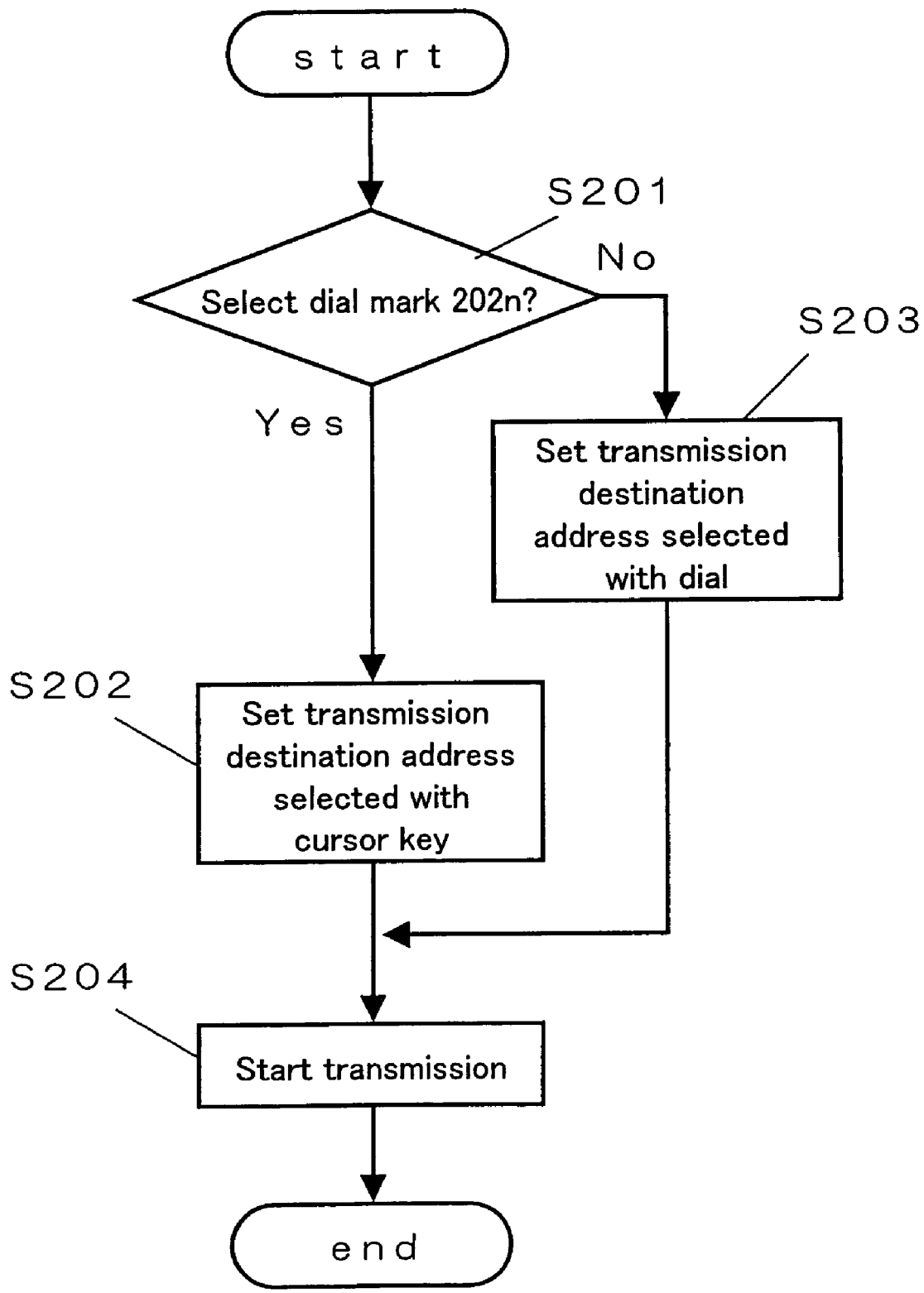
FIG. 18 is a flow chart illustrating an operation of the mobile telephone terminal.
Figure 19:
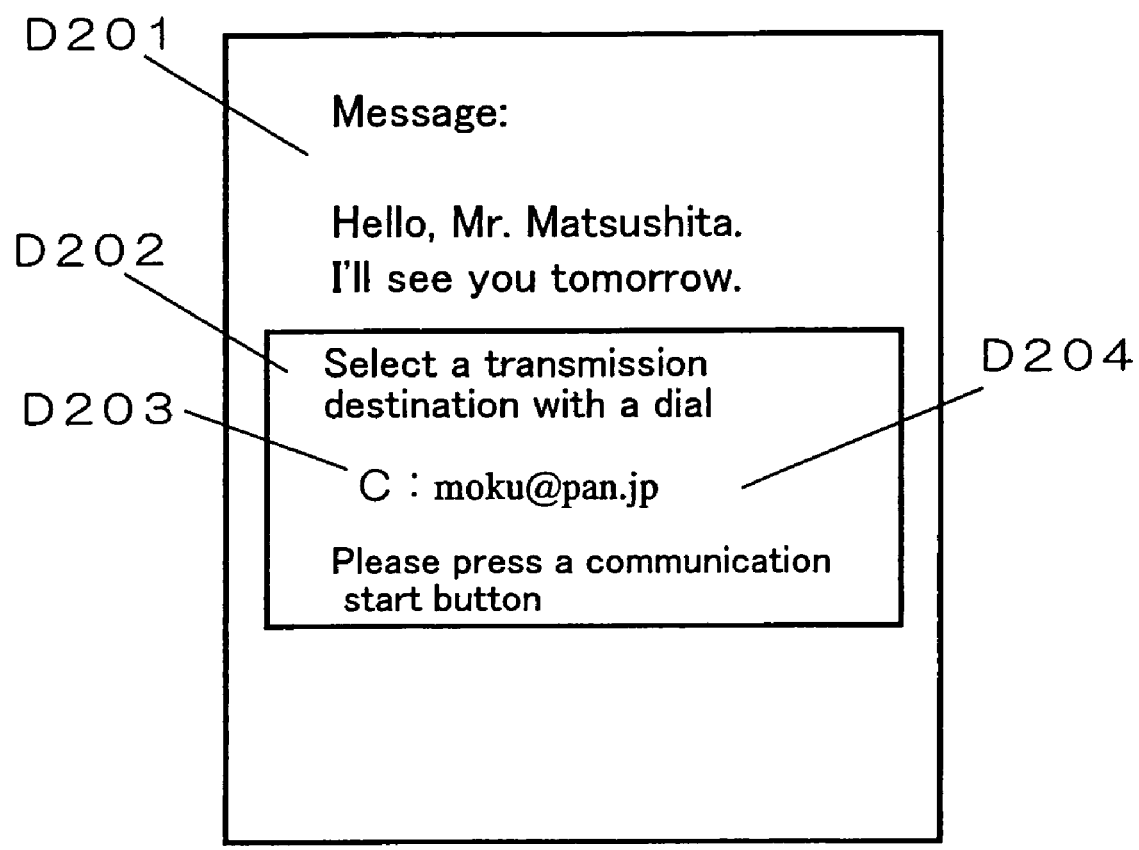
FIG. 19 is a schematic view showing a screen display of a liquid crystal monitor of the mobile telephone terminal.
Figure 20:
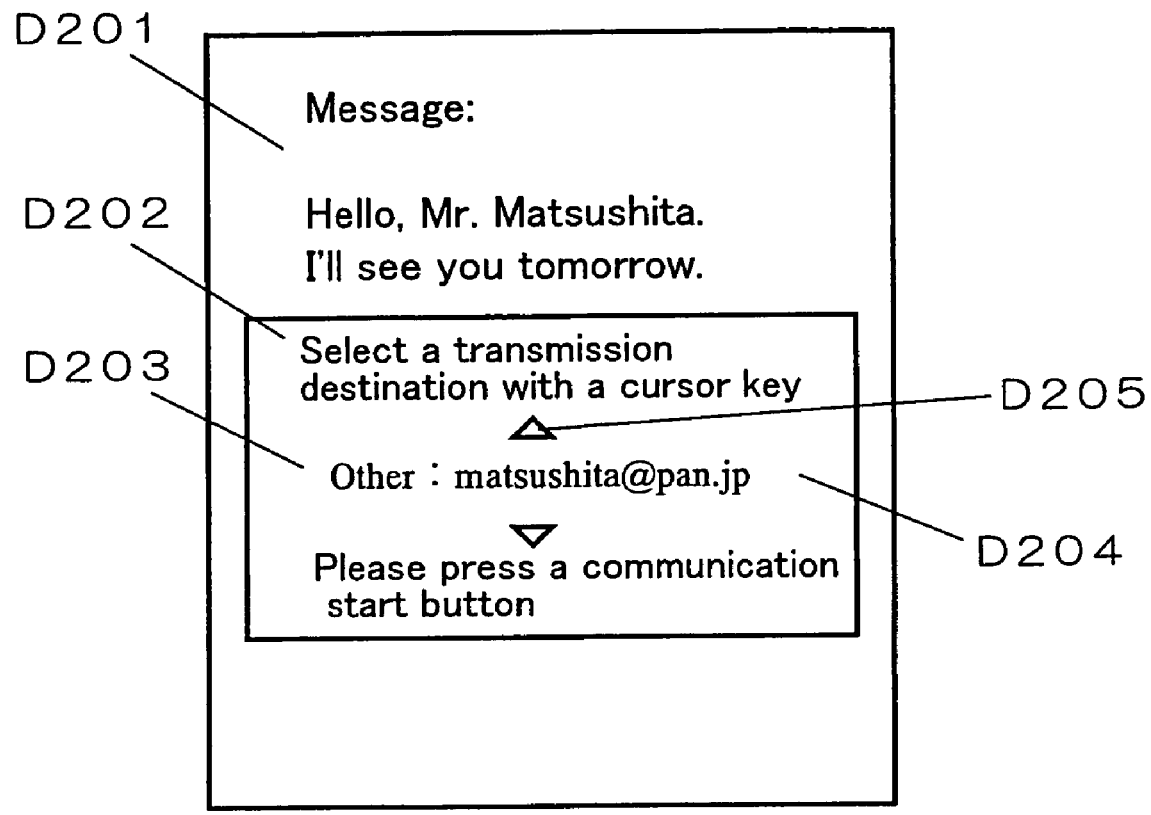
FIG. 20 is a schematic view showing a screen display of a liquid crystal monitor of the mobile telephone terminal.

Hereinafter, the operation from the setting of a transmission destination address of the mobile telephone terminal 201 configured as described above to the commencement of transmission will be described with reference to FIGS. 15 to 20. FIG. 18 is a flow chart illustrating the operation of the mobile telephone terminal 201. FIG. 19 is a schematic view showing a display screen of the liquid crystal monitor 203 in the case of setting a transmission destination address using the dial marks 202a to 202m. FIG. 20 is a schematic view showing a display screen of the liquid crystal monitor 203 in the case of setting a transmission destination address using the dial mark 202n and the cursor key 204.

Herein, in FIGS. 19 and 20, a background image D201 is data to be transmitted to the transmission destination, which is input by the operator with a ten key pad 208. When the transmission destination address is set, a transmission destination address selecting screen D202 is displayed so as to be overlapped with the background image D201. In the transmission destination address selecting screen D202, a dial mark display D203 showing whether any one of the dial marks 202a to 202n has been oriented to the index 207 (see FIG. 16) is displayed. Furthermore, in the transmission destination address selecting screen D202, a transmission destination address display D204 showing a transmission destination address is displayed adjacent to the dial mark display D203. Furthermore, in FIG. 20, a cursor key availability display D205, showing that an up-and-down key of the cursor key 204 may be operated in order to change the transmission destination address display D204, is displayed.

First, the operator inputs data to be transmitted to a transmission destination with the ten key pad 208. For example, the background image D201 as shown in FIGS. 19 and 20 is data to be input by the operator. Next, the operator starts setting a transmission destination address by rotating the dial 202 (start in FIG. 18). When the dial 202 is rotated, the system controller 210 monitors whether or not the dial mark 202n has been oriented to the index 207 (S201). More specifically, the system controller 210 monitors whether or not the dial 202 has selected the second state.

Then, when the dial mark 202n has not been oriented to the index 207, the system controller 210 sets a transmission destination address assigned to the dial mark oriented to the index 207. For example, when the dial mark 202c is oriented to the index 207, as shown in FIG. 19, "C" (see FIG. 16) printed in a portion of the dial mark 202c on the upper surface of the dial 202 is displayed as the dial mark display D203. Then, the transmission destination address ("moku@pan.jp" in this example) assigned to the dial mark 202c by the operator is read from the memory 212 as the transmission destination address display D204, and displayed on the liquid crystal monitor 203. Then, when the operator presses the communication start button 205, the system controller 210 instructs the communication part 211 to transmit data to the transmission destination address. The communication part 211 starts transmission under the control of the system controller 210 (S204).

On the other hand, when the dial mark 202n has been oriented to the index 207 (Yes in S201), the system controller 210 reads the transmission destination address assigned to the dial mark 202n from the memory 212, and displays the transmission destination address on the liquid crystal monitor 203 (see FIG. 20). The system controller 210 assigns the function of selecting a transmission destination address to the up-and-down key of the cursor key 204. Therefore, the operator can set a transmission destination address using the up-and-down key of the cursor key 204 (S202). In FIG. 20, when the operator operates the up-and-down key of the cursor key 204, only the transmission destination address display D204 is changed while the dial mark display D203 keeps displaying "Others". Herein, in accordance with the operation of the up-and-down key of the cursor key 204, the addresses previously registered in the memory 212 by the operator are displayed successively. Thus, when the operator presses the communication start button 206 after setting the transmission destination address, the system controller 210 instructs the communication part 211 to transmit data such as character data to be shown in the background image D201 to the transmission destination address displayed on the liquid crystal monitor 203 as the transmission destination address display D204. The communication part 211 starts transmission under the control of the system controller 210 (S204).

Thus, the present invention also is applicable to the mobile telephone terminal 201. In particular, the present invention can be applied for setting a transmission destination address. Furthermore, it is preferable that the dial marks 202a to 202m are assigned transmission destination addresses with a high transmission frequency. In this case, it is more preferable that the operator can set arbitrarily which transmission destination address is assigned to which dial marks 202a to 202n. In the mobile telephone terminal 201, a number of transmission destination addresses generally are stored; however, those that have a high use frequency are limited. Therefore, if the present invention is applied, transmission destination addresses with a high use frequency can be set by one action, and a number of transmission destination addresses with a low use frequency can be set although a period of time is required to some degree for setting.

In the present embodiment, although a transmission destination address has been illustrated as an example of a setting value at the mobile telephone terminal, the setting value may be a telephone number.

Embodiment 3

In Embodiments 1 and 2 of the present invention, the case where the first operation switch is a dial has been described. In contrast, in Embodiment 2 of the present invention, the case where the first operation switch is a collection of press buttons will be described. In particular, the case of tuning a television receiver body using a remote controller will be described.

Television broadcast is being digitized, and cable television also is spreading, so that a multi-channel of a broadcast station is considered to proceed in the future. Therefore, there is a demand for a remote controller for controlling a television receiver body, capable of efficiently selecting any one of a number of channels. However, it is not preferable to increase the number of press buttons for tuning in to a channel. If the present invention is applied to such a remote controller and a television receiver body, efficient tuning is possible without increasing the number of press buttons. Hereinafter, a television receiver body 301 and a remote controller 304 according to Embodiment 3 of the present invention, which satisfy the above demand, will be described.

Figure 21:
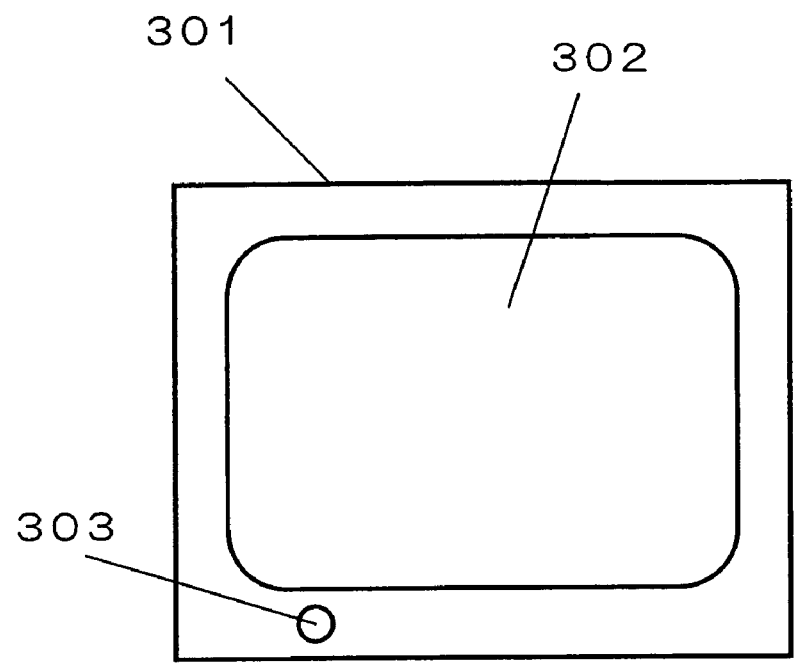
FIG. 21 is a schematic view showing an external view of a television receiver set according to Embodiment 3 of the present invention.
Figure 21:
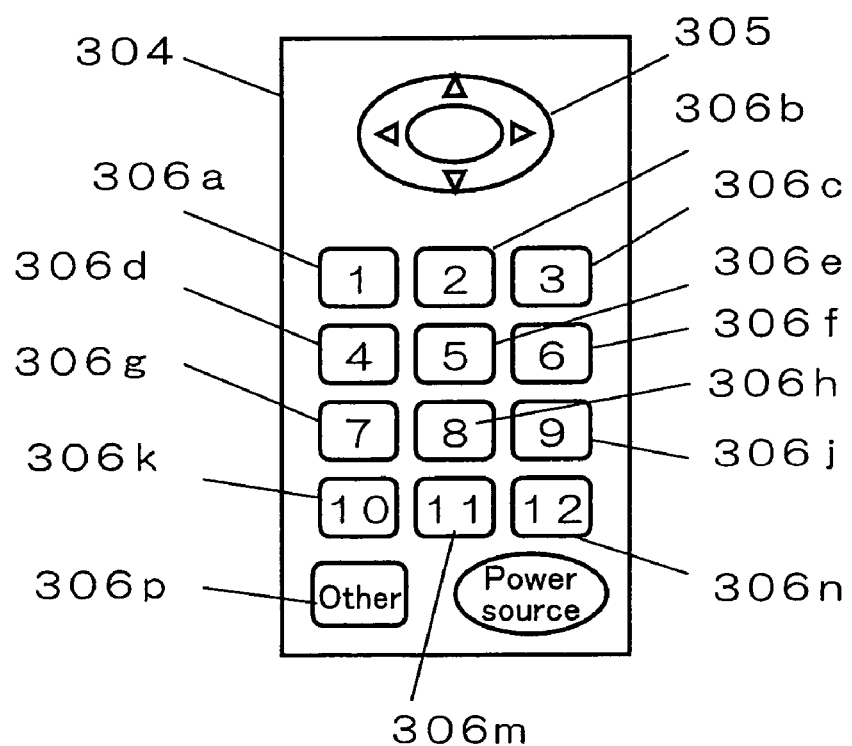

FIG. 21 is a schematic view showing external appearances of the television receiver body 301 and the remote controller 304 according to Embodiment 3 of the present invention.

The television receiver body 301 includes a monitor 302 and a remote control signal receiving part 303. The monitor 302 is a display capable of displaying a video, such as a Braun tube, a liquid crystal display (LCD), a plasma display (PD), and an organic EL display. The remote control signal receiving part 303 receives a control signal of infrared rays or the like transmitted from the remote controller 304.

The remote controller 304 is an apparatus for remotely controlling the television receiver body 301. The remote controller 304 includes a cursor key 305, a tuning part 306, and the like. The cursor key 305 is an operation switch for moving a cursor to be displayed on the monitor 302 or setting an operating condition such as a channel to be displayed on the monitor 302.

A tuning part 306 includes a plurality of tuning keys 306a to 306p. The tuning part is an operation switch for tuning in to a broadcast channel to be played on the monitor 302. The tuning keys 306a to 306n respectively are assigned broadcast channels. By pressing any one of the tuning keys 306a to 306n, a video from the broadcast channel assigned to the pressed tuning key can be played on a monitor. On the other hand, the tuning key 306p is assigned a plurality of broadcast channels. When the tuning key 306p is pressed, the broadcast channel assigned to the tuning key 306p is displayed on the monitor 302. Then, the displayed broadcast channel can be set with the cursor key 305.

Figure 22:
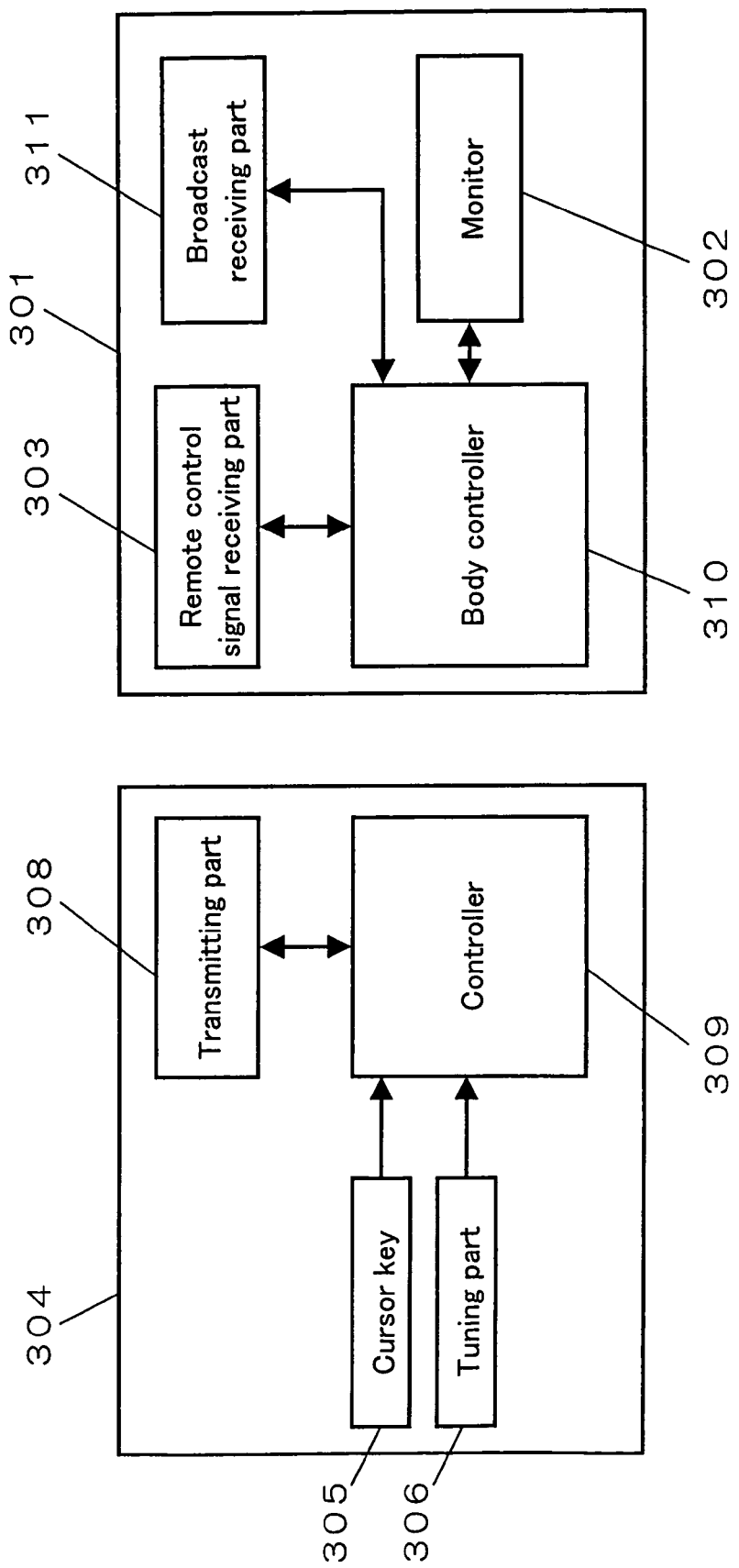
FIG. 22 is a block diagram showing a configuration of the television receiver set.

FIG. 22 is a block diagram showing the configurations of the television receiver body 301 and the remote controller 304.

The remote controller 304 includes a remote controller 309 and a transmitting part 308, in addition to the cursor key 305 and the tuning part 306. The controller 309 controls the entire remote controller 304 such as the transmitting part 308. The controller 309 is operated in accordance with a control signal from the operation switches such as the cursor key 305 and the tuning part 306. The transmitting part 308 transmits infrared rays and the like as a control signal for controlling the television receiver body 301.

The television receiver body 301 includes a body controller 310 and a broadcast receiving part 311, in addition to the monitor 302 and the remote control signal receiving part 303. The body controller 310 controls the entire television receiver body 301 such as the monitor 302, the remote control signal receiving part 303, and the broadcast receiving part 311. The body controller 310 is operated in accordance with a control signal received at the remote control signal receiving part 303. The broadcast receiving part 311 tunes a broadcast channel to receive a video signal and the like from a broadcast station. The broadcast receiving part 311 includes a tuner, an amplifier, and the like.

The tuning part 306 is an example of the first operation switch of the present invention. The monitor 302 is an example of the display of the present invention. The cursor key 305 is an example of the second operation switch of the present invention. The body controller 310 is an example of the controller of the present invention. A television receiver set 320 composed of the television receiver body 301 and the remote controller 304 is an example of the electronic appliance of the present invention. In this case, the broadcast channel is an example of a setting value in the present invention. The state where any one of the tuning keys 306a to 306n of the tuning part 306 is pressed is an example of the first state in the present invention. The state where the tuning key 306p of the tuning part 306 is pressed is an example of the second state in the present invention.

Figure 23:
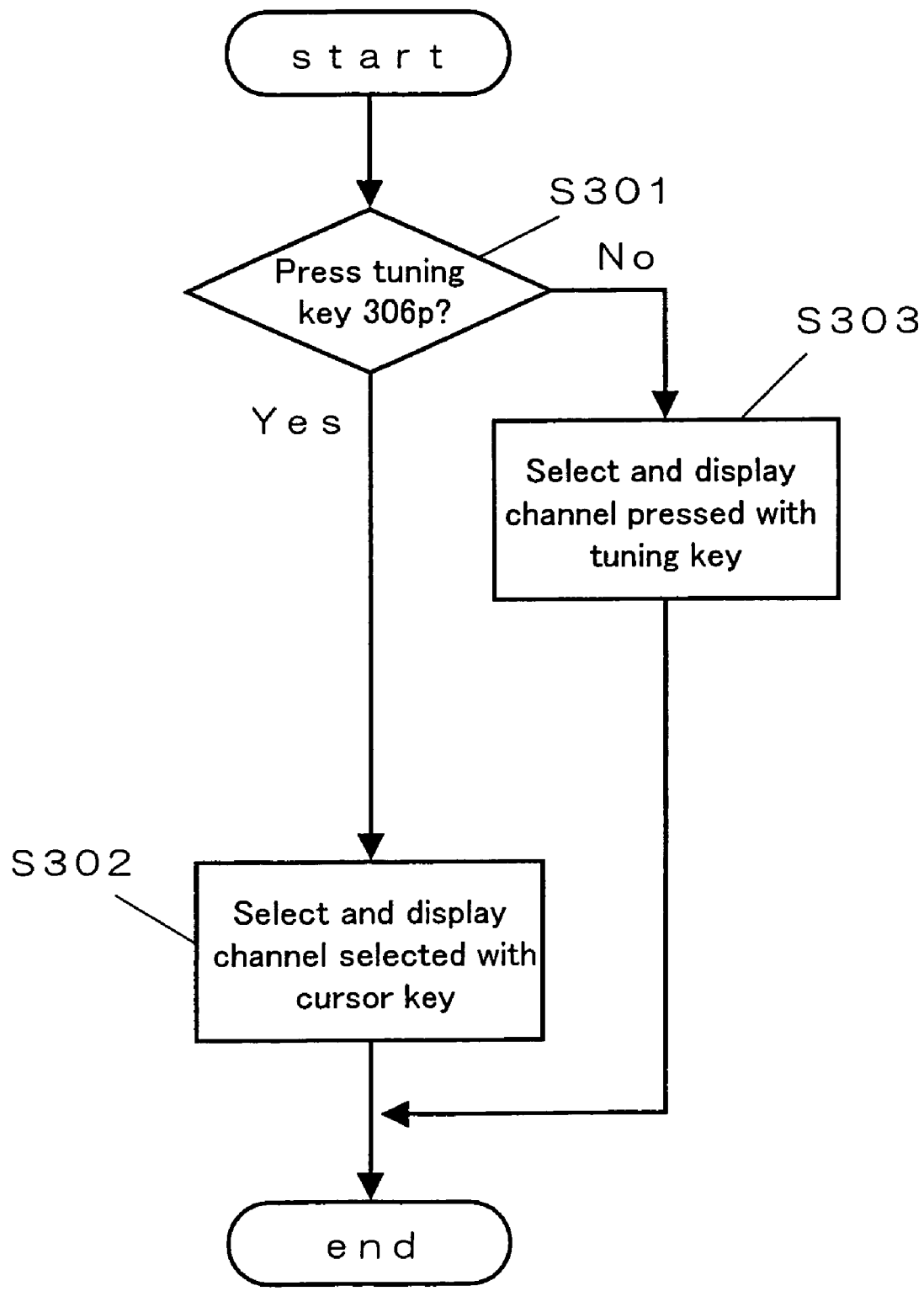
FIG. 23 is a flow chart illustrating an operation of the television receiver set.
Figure 24:
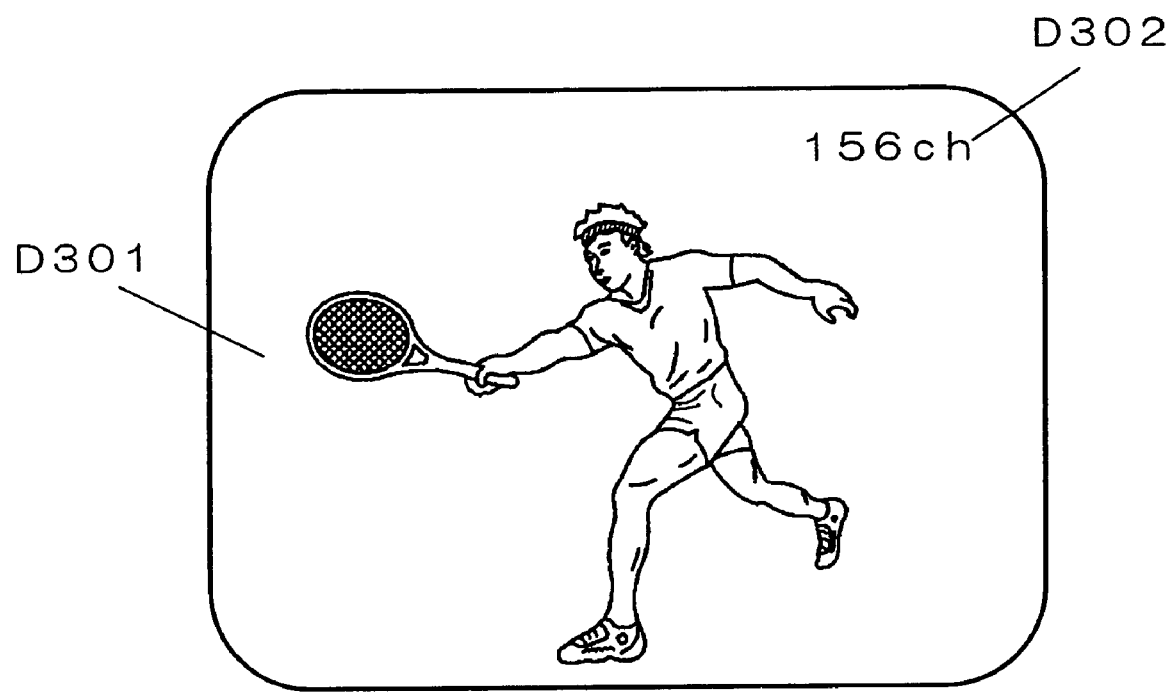
FIG. 24 is a schematic view showing a screen display of a monitor of the television receiver set.

The operation of setting a broadcast channel of the television receiver set 320 configured as described above will be described with reference to FIGS. 21 to 24. FIG. 23 is a flow chart illustrating the operation of the television receiver set 320. FIG. 24 is a schematic view showing a display screen of the monitor 302 in the case of selecting a broadcast channel using the tuning key 306p and the cursor key 305. Herein, in FIG. 24, the background image D301 is a video received from the broadcast station. When a broadcast channel is selected, a selection channel display D302 is displayed so as to be overlapped with the background image D201.

When a power source of the television receiver body 301 is in an ON state, the body controller 310 always monitors whether or not the remote control signal receiving part 303 has received a control signal from the remote controller 304. At this time, the body controller 310 monitors whether or not the tuning key 306p has been pressed (S301).

If any one of the other tuning keys 306a to 306n is pressed without the tuning key 306p being pressed, the controller 309 transmits a control signal showing the above to the body controller 310 via the transmitting part 308. The body controller 310 receives the control signal, and allows the broadcast receiving part 311 to tune in to the selected broadcast channel. Then, the body controller 310 allows a video signal received at the broadcast channel to be played on the monitor 302 (S303).

On the other hand, when the tuning key 306p has been pressed (Yes in S301), the controller 309 transmits a control signal showing that the tuning key 306p has been pressed to the body controller 310. The body controller 310 receives the control signal, and sets the control signal by the cursor key 305 as the control signal for tuning in to a broadcast channel. More specifically, the body controller 310 assigns the function of tuning in to a broadcast channel to the cursor key 305. Then, upon detecting that the cursor key 305 has been pressed via the remote control signal receiving part 303, the body controller 310 changes a broadcast channel, and allows the broadcast receiving part 311 to tune in to the changed broadcast channel. Then, the body controller 310 allows the video signal received at the broadcast channel to be played on the monitor 302 (S302). Herein, when a right-and-left button of the cursor key 305 is pressed, a channel can be increased/decreased one by one. Furthermore, when an up-and-down button of the cursor key 305 is pressed, a channel can be increased/decreased by 10.

As described above, according to Embodiment 3 of the present invention, efficient tuning can be performed without increasing the number of tuning keys 306a to 306p of the remote controller 304.

Embodiment 4

The present invention also is applicable to a household electric appliance such as a microwave oven and a washing machine. In Embodiment 4 of the present invention, the case of setting a cooking menu of a microwave oven 401 will be described.

Recently, the functionality of a microwave oven is being enhanced, whereby the number of kinds of cooking menus can be set finely. On the other hand, when the number of cooking menus increases, there is a problem that selection becomes complicated, which results in poor operability. By applying the present invention, a cooking menu that is generally used frequently can be set easily with a dial, and various kinds of cooking menus also can be selected with a liquid crystal monitor 404 and a cursor key 405.

Figure 25:
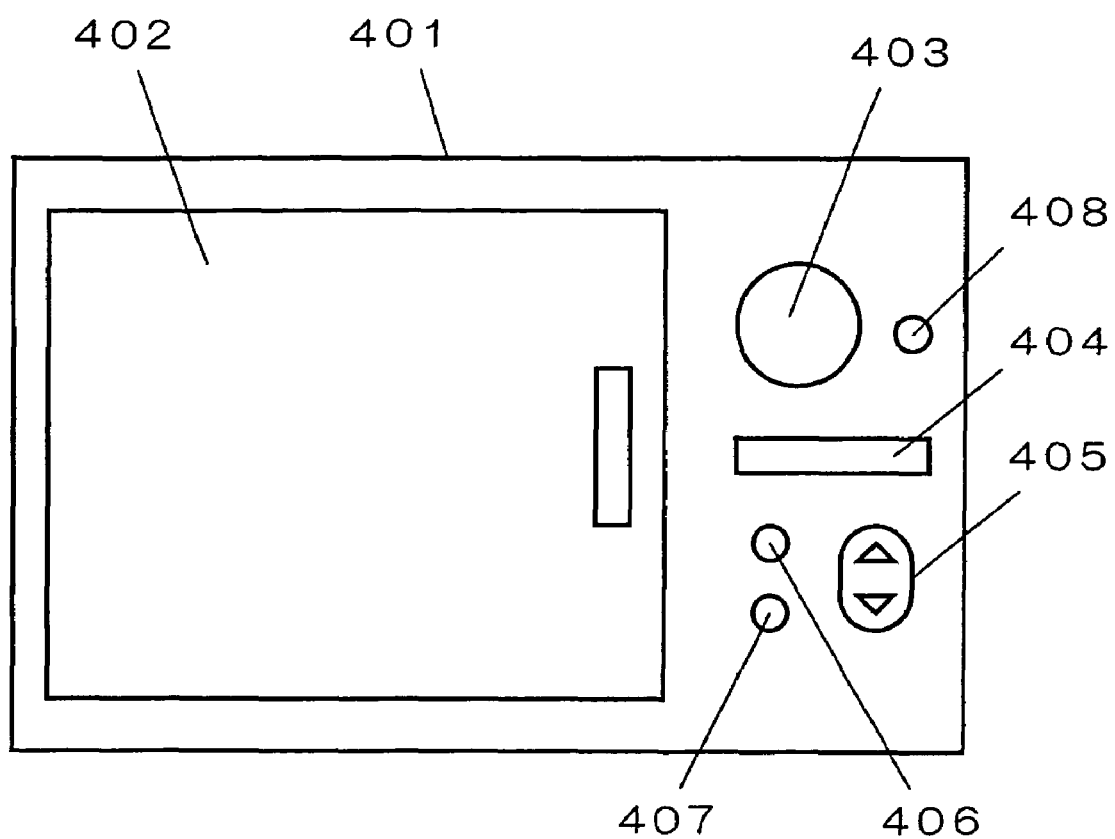
FIG. 25 is a schematic view showing an external appearance of a microwave oven according to Embodiment 4 of the present invention.

FIG. 25 is a schematic view showing an external appearance of the microwave oven 401 according to Embodiment 4 of the present invention. The microwave oven 401 includes a cooking part 402, a menu dial 403, a liquid crystal monitor 404, a cursor key 405, a time setting button 406, a temperature setting button 407, and a cooking start button 408. The cooking part 402 has an open/close door. When food is placed inside the cooking part 402 and cooking is started, the cooking part 402 cooks the food by heating. The menu dial 403 is an operation switch for selecting a cooking menu. The liquid crystal monitor 404 is a display for displaying information on the selection of a cooking menu, the setting of a cooking time, the setting of a cooking temperature, and the like. The cursor key 405 is an operation switch for selecting a setting value displayed on the liquid crystal monitor 404. The time setting button 406 is an operation switch to be pressed for setting only a cooking time manually. When the time setting button 406 is pressed, a settable cooking time is displayed on the liquid crystal monitor 404, and a cooking time can be set with the cursor key 405. The temperature setting button 407 is an operation switch to be pressed for setting only a cooking temperature manually. When the temperature setting button 407 is pressed, a settable cooking temperature is displayed on the liquid crystal monitor 404, and a cooking temperature can be set with the cursor key 405. The cooking start button 408 is an operation switch for starting cooking in the cooking part 402.

Figure 26:
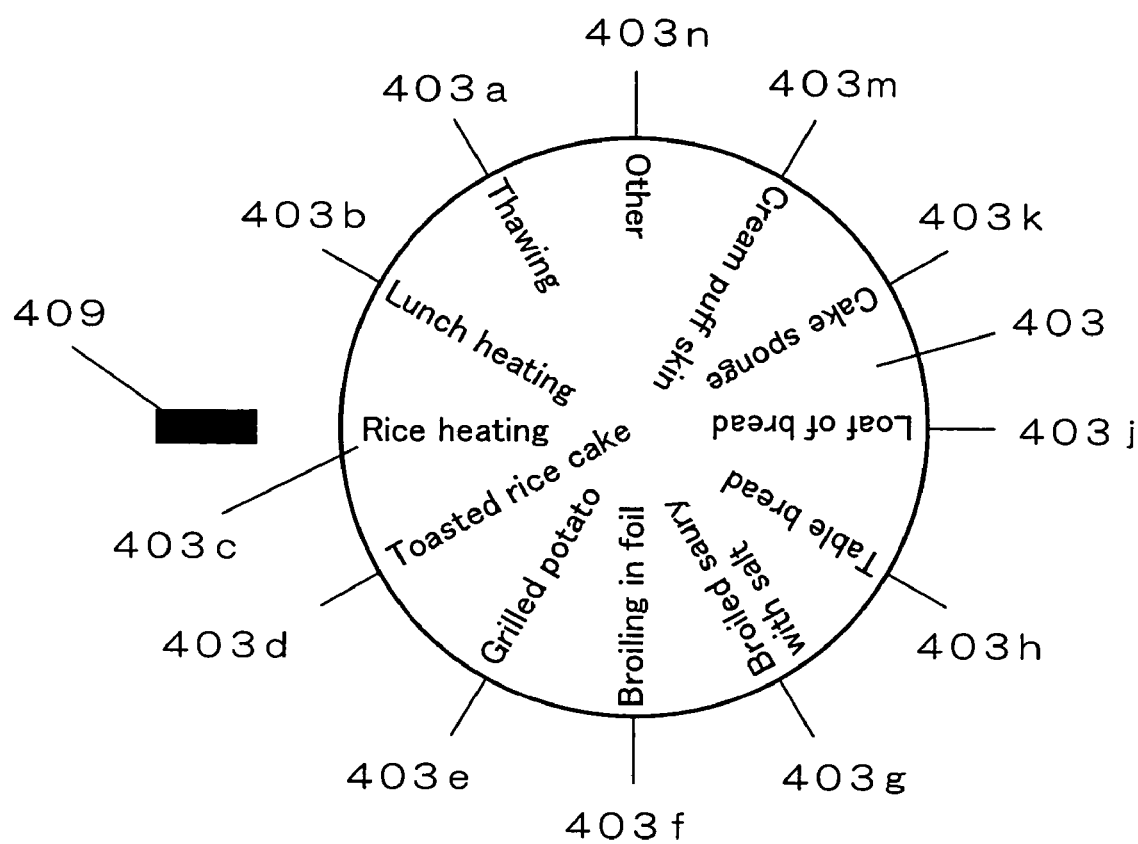
FIG. 26 is a plan view showing a dial of the microwave oven.

FIG. 26 is a schematic view showing the menu dial 403. An index 409 is fixed to the microwave oven 401 body. The menu dial 403 has dial marks 403a to 403n. The dial marks 403a to 403m respectively are assigned cooking menus. When any one of the dial marks 403a to 403m is oriented to the index 409, the cooking menu assigned to that dial mark is set. Furthermore, the dial mark 403n is assigned a plurality of cooking menus. When the dial mark 403n is oriented to the index 409, any one of the plurality of cooking menus assigned to the dial mark 403n can be set using the cursor key 405.

Figure 27:
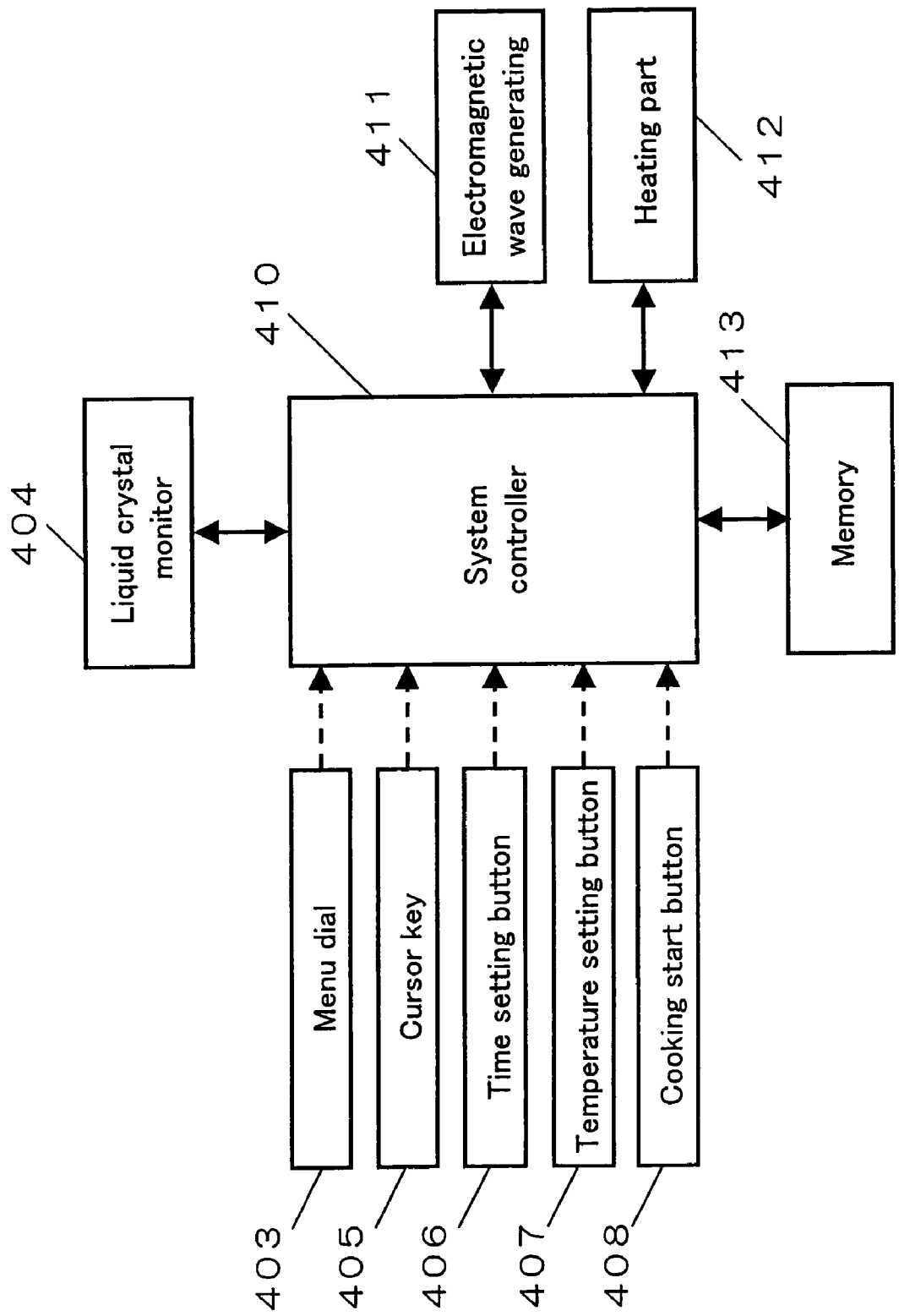
FIG. 27 is a block diagram showing a configuration of the microwave oven.

FIG. 27 is a block diagram showing a configuration of the microwave oven 401 according to Embodiment 4 of the present invention. A system controller 410 controls the entire system such as a liquid crystal monitor 404, an electromagnetic wave generating part 411, and a heating part 412. The system controller 410 receives a control signal from operation switches such as the menu dial 403, the cursor key 405, the time setting button 406, the temperature setting button 407, and the cooking start button 408, thereby controlling the entire system. The electromagnetic wave generating part 411 and the heating part 412 are included in the cooking part 402. The electromagnetic wave generating part 411 is means for heating by generating a microwave to vibrate electrons in a food material. The heating part 412 is means that is composed of a heating wire and a ceramic heater, and heats the food material with infrared rays or the like. When a cooking menu is set with the menu dial 403, the system controller 410 controls the electromagnetic wave generating part 411 and the heating part 412 so as to achieve a time, a temperature, and the like that are previously set on the cooking menu basis. A memory 413 stores cooking conditions (heating time, temperature, etc.) on the cooking menu basis.

The menu dial 403 is an example of the first operation switch of the present invention. The liquid crystal monitor 404 is an example of the display of the present invention. The cursor key 405 is an example of the second operation switch of the present invention. The system controller 410 is an example of the controller of the present invention. The microwave oven 401 is an example of the electronic appliance of the present invention. In this case, the cooking menu is an example of a setting value in the present invention. The state where any one of the dial marks 403a to 403m of the menu dial 403 is oriented to the index 409 is an example of the first state in the present invention. The state where the dial mark 403n of the menu dial 403 is oriented to the index 409, is an example of the second state in the present invention.

Figure 28:
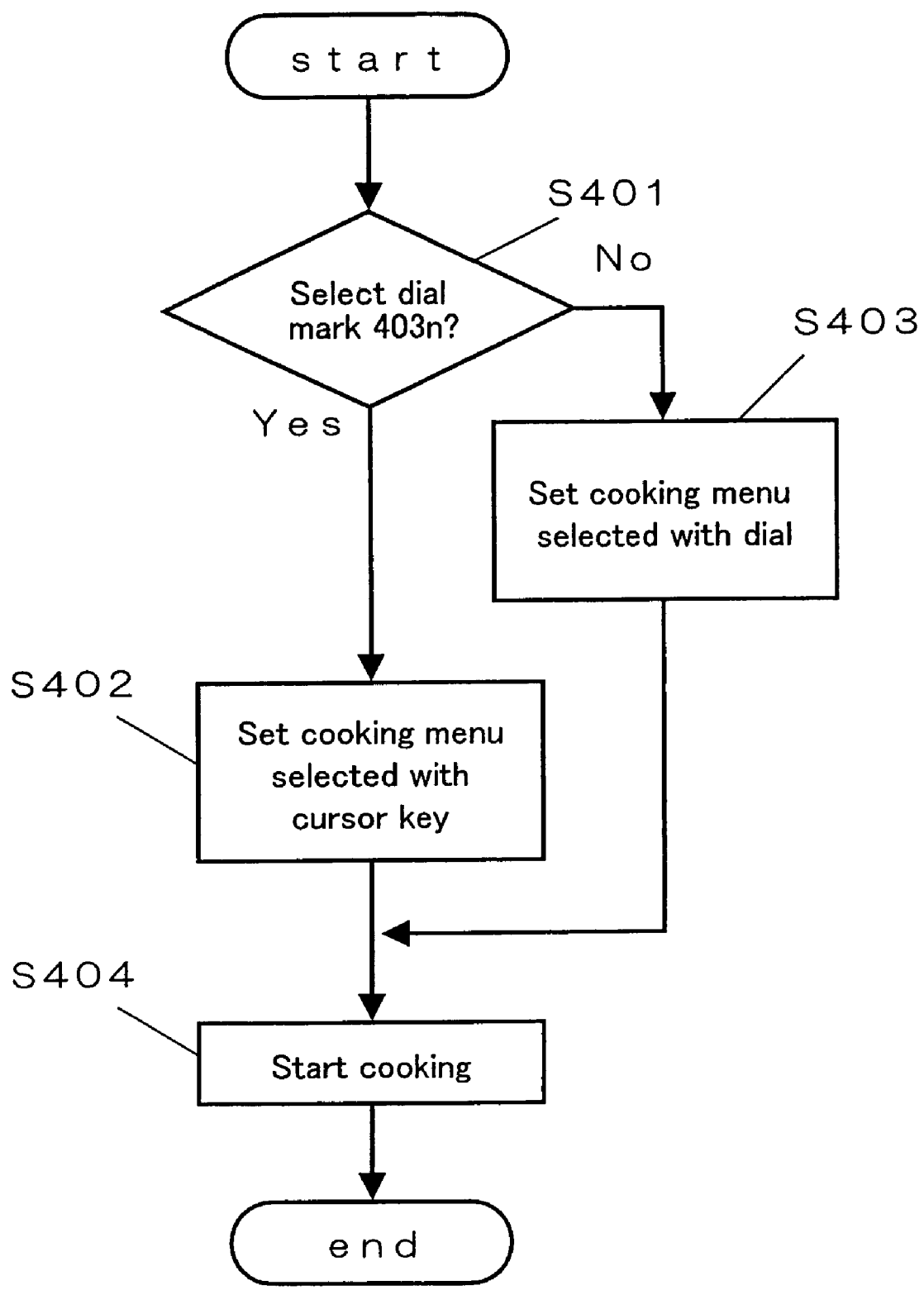
FIG. 28 is a flow chart illustrating an operation of the microwave oven.
Figure 29:
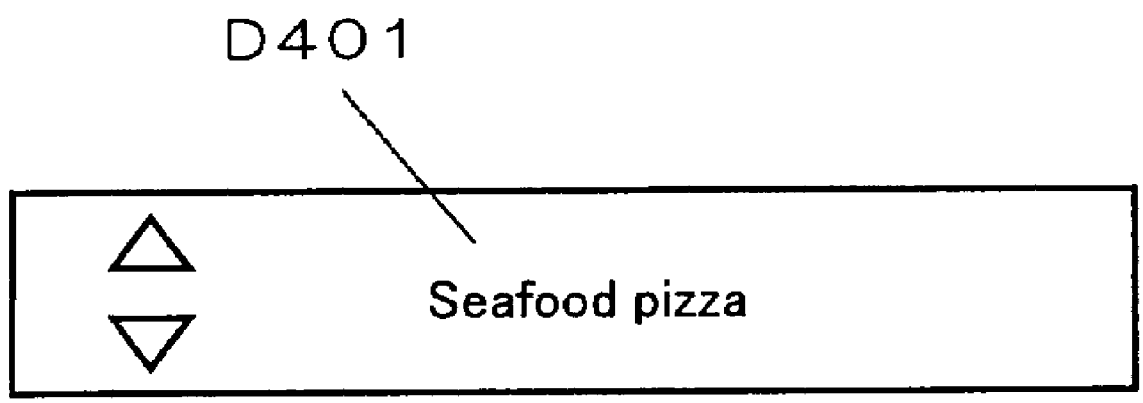
FIG. 29 is a schematic view showing a screen display of a liquid crystal monitor of the microwave oven.
Figure 30:
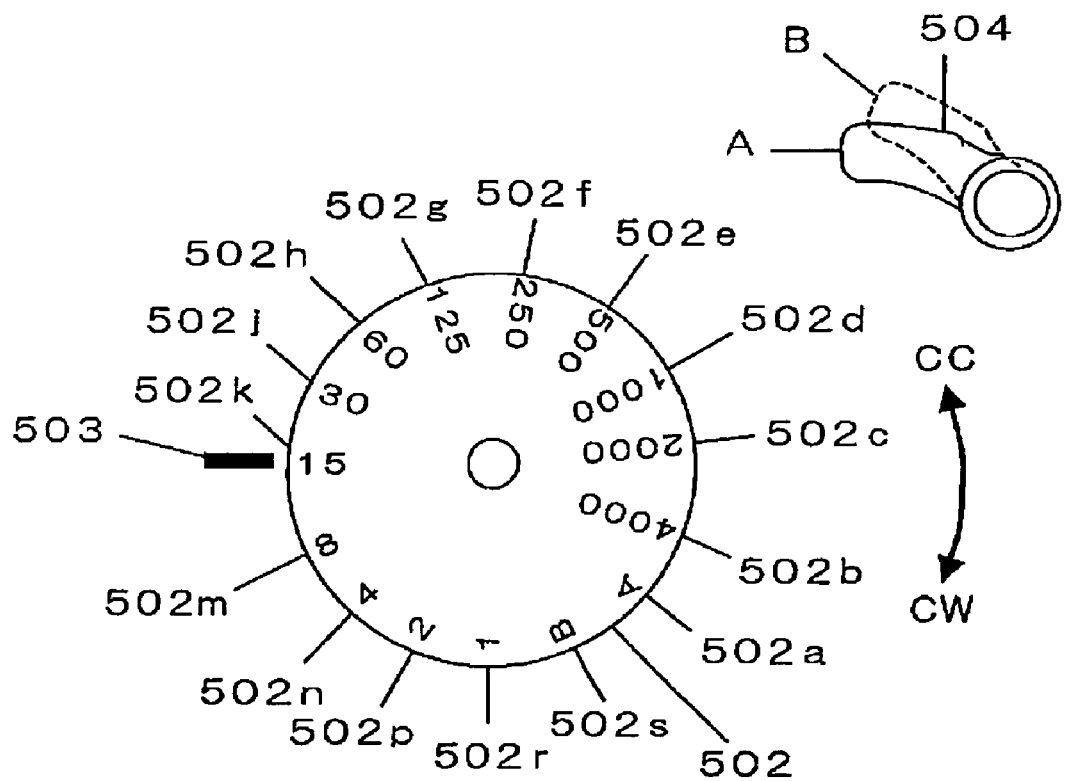
FIG. 30 is a schematic view showing a shutter dial and an operation lever of a conventional camera.

The operation of setting a cooking menu of the microwave oven 401 configured as described above will be described with reference to FIGS. 25 to 29. FIG. 28 is a flow chart illustrating the operation of the microwave oven. FIG. 29 is a schematic view showing a display screen of the liquid crystal monitor 404 in the case of setting a cooking menu using the dial mark 403n and the cursor key 405.

First, the operator sets a food material to be cooked in the cooking part 402. Then, the operator starts setting a cooking menu by rotating the menu dial 403 (start in FIG. 28). When the menu dial 403 is rotated, the system controller 410 monitors whether or not the dial mark 403n has been oriented to the index 409 (S401). More specifically, the system controller 410 monitors whether or not the menu dial 403 has selected the second state.

When the dial mark 403n has not been oriented to the index 409, the system controller 410 sets a cooking menu assigned to the dial mark oriented to the index 409 (S403). For example, as shown in FIG. 26, when the dial mark 403c has been oriented to the index 409, the system controller 410 reads conditions previously stored for "rice heating" from the memory 212 and sets it. Next, when the operator presses the cooking start button 408, the electromagnetic wave generating part 411 and/or the heating part 412 starts being driven. The system controller 410 controls the electromagnetic wave generating part 411 and/or the heating part 412 so that they are driven under the conditions set in Step S403 (S404).

On the other hand, when the dial mark 403n has been oriented to the index 409 (Yes in S401), the system controller 410 allows the liquid crystal monitor 404 to display a cooking menu display D401 showing the cooking menu assigned to the dial mark 403n (see FIG. 29). Then, the system controller 410 assigns the function of selecting a cooking menu to the cursor key 405. Therefore, the operator can set a cooking menu using the cursor key 405 (S403). In FIG. 29, when the operator operates the cursor key 405, the cooking menu display D401 is changed. When the cooking menu display D401 is set and displayed, the system controller 410 sets a cooking menu (S402). For example, as shown in FIG. 29, when "seafood pizza" is displayed, the system controller 410 reads conditions previously stored for the "seafood pizza" from the memory 212 and sets it. When the operator presses the cooking start button 408 after setting as described above, the electromagnetic wave generating part 411 and/or the heating part 412 starts being driven. The system controller 410 controls the electromagnetic wave generating part 411 and/or the heating part 412 so that they are driven under the conditions set in Step S402 (S404).

As described above, according to Embodiment 4 of the present invention, the present invention can enhance the operability of a household electric appliance. In the present embodiment, a microwave oven has been illustrated as an example of the household electric appliance. In addition, the present invention is applicable to, for example, various household electric appliances for cooking capable of setting a plurality of kinds of cooking menus, such as an electronic oven, a toaster, an electric rice cooker, a coffee maker, and a baking machine. Alternatively, if the present invention is applied to a household electric appliance having a plurality of kinds of operation modes, other than the household electric appliances for cooking, an operation mode can be selected easily. Examples of such an electric appliance include, but are not limited to, a vacuum machine, a dishwasher, a washing machine, and a drier.

Furthermore, for example, the present invention may be applied to the designation of a display area in a car navigation system. The car navigation system has a high possibility of being operated by a driver during driving, so that an operation becomes difficult if the number of operation components is large. When the operator is allowed to select an area to be displayed on the display, an area with a high use frequency is assigned to the first state, and an area with a low use frequency is assigned to the second state.

INDUSTRIAL APPLICABILITY

The present invention can be used as an electronic appliance that includes a first operation switch and a second operation switch, and has a display for displaying a setting value.

The invention claimed is:

1. An electronic appliance, comprising:
   a first operation switch that allows an operator to select a first state assigned one setting value or a second state assigned a plurality of setting values;
   a display that displays the setting values assigned to the second state, when the second state is selected with the first operation switch;
   a second operation switch that allows the operator to select any one of the setting values displayed on the display; and
   a controller that sets a first setting value assigned to the first state as an operating condition, when the first state is selected with the first operation switch, and sets a second setting value selected with the second operation switch as an operating condition, when the second state is selected with the first operation switch.

2. The electronic appliance according to claim 1, wherein the controller allows the display to show a display that prompts the operator to select a setting value with the second operation switch, when the second state is selected with the first operation switch.

3. The electronic appliance according to claim 2, wherein the display that prompts the operator to select a setting value with the second operation switch includes a picture symbol.

4. The electronic appliance according to claim 1, wherein the controller varies a display embodiment of a setting value to be displayed on the display before and after setting the setting value selected with the second operation switch as the operating condition.

5. The electronic appliance according to claim 1, wherein the electronic appliance is a camera, and
   the selling value is at least one of a shutter speed and an aperture value.

6. The electronic appliance according to claim 1, wherein the electronic appliance is a mobile telephone terminal, and
   the setting value is a transmission destination identifier.

7. The electronic appliance according to claim 1, wherein the electronic appliance is a television receiver set, and
   the setting value is a broadcast channel.

8. The electronic appliance according to claim 1, wherein the electronic appliance is a household electric appliance for cooking, and
   the setting value is a cooking menu.

9. The electronic appliance according to claim 1, wherein the electronic appliance has a plurality of operation modes, and
   the setting value is a selected operation mode of said plurality of operation modes.

* * * * *